(12) United States Patent
Bannister et al.

(10) Patent No.: US 10,898,839 B2
(45) Date of Patent: Jan. 26, 2021

(54) PRE-CLEANING AIR FILTER

(71) Applicant: Cummins Filtration IP, Inc., Columbus, IN (US)

(72) Inventors: Robert A. Bannister, Stoughton, WI (US); Kelly A. Detra, Brooklyn, WI (US); Joel Roltgen, DeForest, WI (US); Mark V. Holzmann, Stoughton, WI (US)

(73) Assignee: CUMMINS FILTRATION IP, INC, Columbus, IN (US)

( * ) Notice: Subject to any disclaimer, the term of this patent is extended or adjusted under 35 U.S.C. 154(b) by 621 days.

(21) Appl. No.: 15/535,189

(22) PCT Filed: Dec. 18, 2015

(86) PCT No.: PCT/US2015/066579
§ 371 (c)(1),
(2) Date: Jun. 12, 2017

(87) PCT Pub. No.: WO2016/100772
PCT Pub. Date: Jun. 23, 2016

(65) Prior Publication Data
US 2017/0368487 A1    Dec. 28, 2017

Related U.S. Application Data

(60) Provisional application No. 62/094,314, filed on Dec. 19, 2014.

(51) Int. Cl.
*B01D 45/08* (2006.01)
*B01D 50/00* (2006.01)
(Continued)

(52) U.S. Cl.
CPC ......... *B01D 45/08* (2013.01); *B01D 46/0004* (2013.01); *B01D 46/0005* (2013.01);
(Continued)

(58) Field of Classification Search
None
See application file for complete search history.

(56) References Cited

U.S. PATENT DOCUMENTS 2,856,075 A    10/1958  Rudolf
3,745,753 A *   7/1973  Risse ................. B01D 46/0024
                                                    55/481

(Continued)

FOREIGN PATENT DOCUMENTS

CN        2609635 Y      4/2004
CN      102958581 A      3/2013
(Continued)

OTHER PUBLICATIONS

International Search Report and Written Opinion issued for PCT Application No. PCT/US2015/066579, dated Feb. 26, 2016, 22 pages.

(Continued)

*Primary Examiner* — Christopher P Jones
*Assistant Examiner* — Brit E. Anbacht
(74) *Attorney, Agent, or Firm* — Foley & Lardner LLP

(57) ABSTRACT

A filter element including a filter media, an end cap, and a baffle. The filter media is configured to be secured within a housing. The housing includes an inlet configured to accept a fluid for filtering and the filter media including a circumferential outer surface. The end cap is positioned at and coupled to one end of the filter media. The baffle is positioned relative to the filter media at a position such that, when the filter element is correctly installed within the housing, the baffle is proximate the inlet of the housing. The baffle extends around only a portion of the circumferential outer surface of the filter media in a radial direction.

8 Claims, 24 Drawing Sheets

(51) Int. Cl.
  *B01D 46/00* (2006.01)
  *B01D 46/24* (2006.01)
(52) U.S. Cl.
  CPC ..... *B01D 46/0039* (2013.01); *B01D 46/0041* (2013.01); *B01D 46/0045* (2013.01); *B01D 46/0046* (2013.01); *B01D 46/2414* (2013.01); *B01D 50/002* (2013.01); *B01D 2275/206* (2013.01)

(56) References Cited

U.S. PATENT DOCUMENTS

| | | | |
|---|---|---|---|
| 3,920,553 | A | 11/1975 | Cilento |
| 3,928,007 | A * | 12/1975 | Jackson ............. B01D 46/2411 55/337 |
| 4,020,783 | A | 5/1977 | Anderson et al. |
| 4,619,764 | A | 10/1986 | Church et al. |
| 4,906,365 | A | 3/1990 | Baumann et al. |
| 5,098,559 | A | 3/1992 | Mack et al. |
| 5,468,386 | A | 11/1995 | Ardes |
| 5,520,801 | A | 5/1996 | Gerber et al. |
| 5,718,825 | A | 2/1998 | Greive et al. |
| 5,882,367 | A * | 3/1999 | Morgan ............. B01D 46/0031 55/495 |
| 5,888,384 | A | 3/1999 | Wiederhold et al. |
| 5,902,479 | A | 5/1999 | Fukumori et al. |
| 6,015,492 | A | 1/2000 | Popoff et al. |
| 6,068,762 | A | 5/2000 | Stone et al. |
| 6,146,433 | A | 11/2000 | Bitner |
| 6,258,143 | B1 | 7/2001 | Carawan et al. |
| 6,280,493 | B1 | 8/2001 | Eubank |
| 6,308,836 | B1 | 10/2001 | Guichaoua et al. |
| 6,402,798 | B1 * | 6/2002 | Kallsen ................. B01D 35/30 220/293 |
| 6,506,303 | B1 | 1/2003 | Gustafsson et al. |
| 6,543,625 | B1 | 4/2003 | Le Roux et al. |
| 6,565,746 | B1 | 5/2003 | Stamey et al. |
| 6,585,889 | B2 | 7/2003 | Weingaertner |
| 6,706,181 | B1 | 3/2004 | Baumann et al. |
| 6,709,576 | B2 | 3/2004 | Jokschas |
| 6,833,066 | B2 | 12/2004 | Baumann et al. |
| 6,835,305 | B1 | 12/2004 | Baumann et al. |
| 6,902,598 | B2 * | 6/2005 | Gunderson ............. B01D 29/21 55/498 |
| 6,910,692 | B2 | 6/2005 | Malone et al. |
| 6,936,169 | B2 | 8/2005 | Baumann et al. |
| 6,958,083 | B1 * | 10/2005 | Schmitz ............. B01D 46/0046 55/337 |
| 6,972,092 | B1 | 12/2005 | Roll |
| 7,060,184 | B2 | 6/2006 | Cline et al. |
| 7,297,255 | B2 | 11/2007 | Stockbower |
| 7,390,407 | B2 | 6/2008 | Weindorf et al. |
| 7,537,631 | B2 * | 5/2009 | Scott ................. B01D 46/0001 55/498 |
| 7,572,306 | B2 | 8/2009 | Hawkins et al. |
| 7,585,345 | B2 | 9/2009 | Smasal et al. |
| 7,740,678 | B2 * | 6/2010 | Gunderson ........ B01D 46/0021 210/342 |
| 7,833,305 | B1 | 11/2010 | Studer |
| 7,871,517 | B2 | 1/2011 | Komine et al. |
| 7,887,701 | B2 | 2/2011 | Schmid et al. |
| 7,998,251 | B2 | 8/2011 | Pondelick et al. |
| 8,099,999 | B2 | 1/2012 | Nakano |
| 8,168,066 | B2 | 5/2012 | Wieczorek et al. |
| 8,375,925 | B2 | 2/2013 | Ichikawa et al. |
| 8,726,876 | B2 | 5/2014 | Kobayashi et al. |
| 8,784,523 | B2 | 7/2014 | Coulonvaux et al. |
| 8,821,734 | B2 | 9/2014 | Grass et al. |
| 8,828,114 | B2 * | 9/2014 | Dhiman ............... B01D 46/008 55/337 |
| 8,845,897 | B2 | 9/2014 | Wieczorek et al. |
| 9,562,449 | B2 | 2/2017 | Gao et al. |
| 9,718,010 | B2 | 8/2017 | Byun et al. |
| 2002/0100720 | A1 | 8/2002 | Jainek |
| 2002/0108897 | A1 | 8/2002 | Pavlin et al. |
| 2003/0127384 | A1 | 7/2003 | Kapur |
| 2004/0093859 | A1 | 5/2004 | Schmeichel et al. |
| 2004/0139572 | A1 * | 7/2004 | Kisela ................. A47L 9/2842 15/320 |
| 2004/0206682 | A1 | 10/2004 | Hamlin et al. |
| 2005/0193695 | A1 * | 9/2005 | Holmes ............. B01D 46/0002 55/482 |
| 2005/0279958 | A1 | 12/2005 | Baumann |
| 2006/0118475 | A1 | 6/2006 | Girondi |
| 2006/0118476 | A1 | 6/2006 | Weindorf et al. |
| 2006/0207948 | A1 | 9/2006 | Hacker et al. |
| 2007/0215561 | A1 | 9/2007 | Yates et al. |
| 2008/0190082 | A1 * | 8/2008 | Scott ................. B01D 46/0005 55/520 |
| 2008/0289305 | A1 | 11/2008 | Girondi |
| 2010/0122952 | A1 | 5/2010 | South et al. |
| 2010/0146917 | A1 * | 6/2010 | Coulonvaux ...... B01D 46/0005 55/344 |
| 2011/0308212 | A1 * | 12/2011 | Ruhland ............ B01D 46/0024 55/498 |
| 2011/0315126 | A1 | 12/2011 | Yoshida et al. |
| 2012/0067014 | A1 * | 3/2012 | Dhiman ............... B01D 46/008 55/399 |
| 2013/0025557 | A1 | 1/2013 | Chlystek et al. |
| 2013/0043176 | A1 | 2/2013 | Johnson et al. |
| 2013/0213235 | A1 | 8/2013 | Da Silva et al. |
| 2014/0373714 | A1 * | 12/2014 | Cloud ................. B01D 46/0031 95/273 |
| 2016/0177890 | A1 | 6/2016 | Kobayashi et al. |
| 2017/0028324 | A1 | 2/2017 | Komiyama et al. |
| 2017/0368487 | A1 * | 12/2017 | Bannister ............... B01D 45/08 |
| 2019/0217237 | A1 * | 7/2019 | Cloud ................. B01D 46/0031 |

FOREIGN PATENT DOCUMENTS

| | | |
|---|---|---|
| DE | 35 38 589 A1 | 5/1987 |
| DE | 44 44 934 | 12/1994 |
| DE | 19524417 | 7/1995 |
| DE | 19646350 | 11/1996 |
| DE | 19650185 | 12/1996 |
| DE | 10064482 A1 | 7/2002 |
| DE | 69726690 | 10/2004 |
| DE | 60317288 | 8/2008 |
| EP | 0 781 586 A2 | 12/1996 |
| EP | 1 256 707 A2 | 5/2002 |
| EP | 1 616 611 A1 | 1/2006 |
| EP | 1 974 786 A1 | 10/2008 |
| EP | 2 337 618 A1 | 8/2009 |
| EP | 2 263 772 A1 | 5/2010 |
| EP | 2 336 510 A1 | 5/2010 |
| EP | 3 034 823 A1 | 12/2015 |
| JP | 09-010515 | 1/1997 |
| JP | 2004-167295 | 6/2004 |
| KR | 10-2005-0032337 | 4/2005 |
| KR | 10-2006-0069636 | 6/2006 |
| WO | WO 02/20132 | 3/2002 |
| WO | WO-2004/069373 A1 | 8/2004 |
| WO | WO-2007/043669 | 4/2007 |
| WO | WO-2017/108483 A1 | 6/2017 |

OTHER PUBLICATIONS

First Office Action issued for Chinese Patent Application No. 201580067749.0, dated Aug. 28, 2018, including English language translation, 14 pages.
German Office Action in German Application No. 112007001880.1 dated Feb. 6, 2018.
German Office Action in German Application No. 112008001571.6 dated Mar. 1, 2016.
International Search Report and Written Opinion issued for PCT/US2007/075508, dated Dec. 27, 2007, 8 pages.
Notice of Allowance issued for U.S. Appl. No. 16/005,078 dated Apr. 3, 2020, 20 pages.
Office Action issued for Chinese Patent Application No. 200880020548.5, dated Jan. 31, 2012, including English translation, 5 pages.

(56) References Cited

OTHER PUBLICATIONS

Search Report issued for PCT/US2008/067328, dated Dec. 30, 2008, 3 pages.
Written Opinions issued for PCT/US2008/067328, dated Dec. 30, 2008, 6 pages.

* cited by examiner

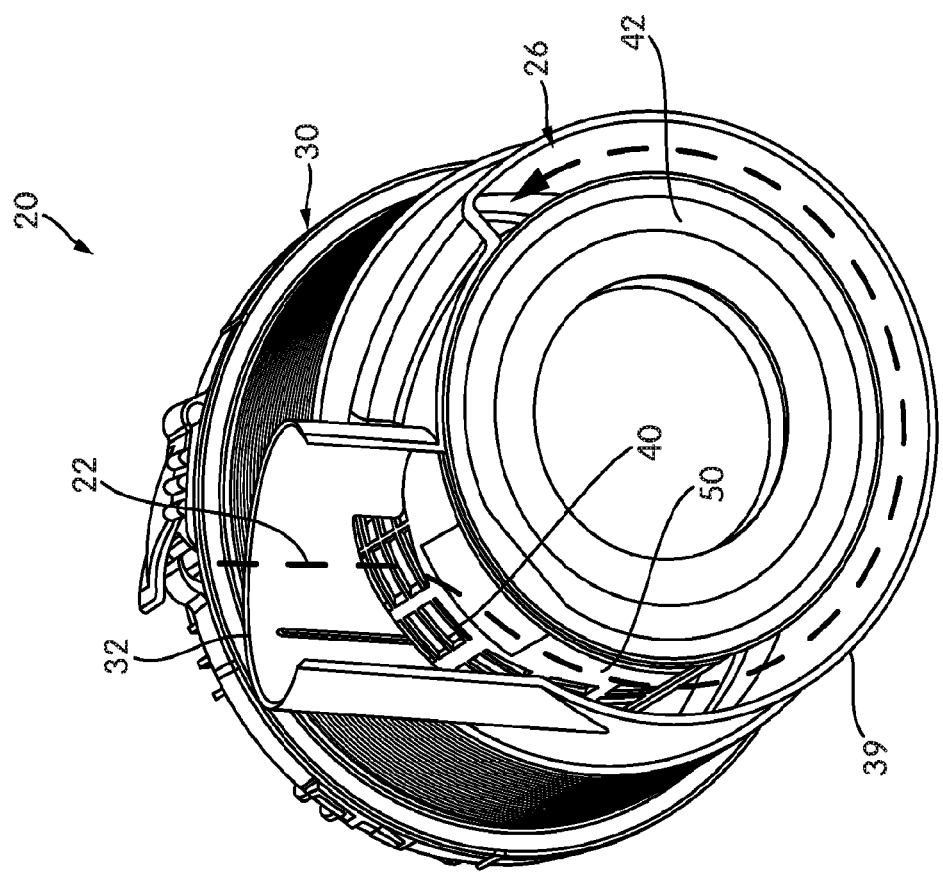
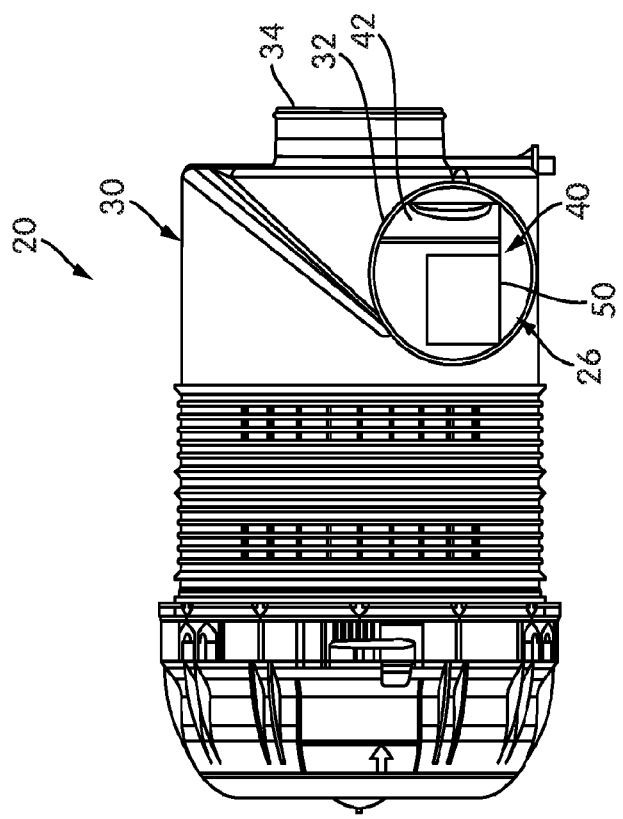
FIG. 1A
FIG. 1B

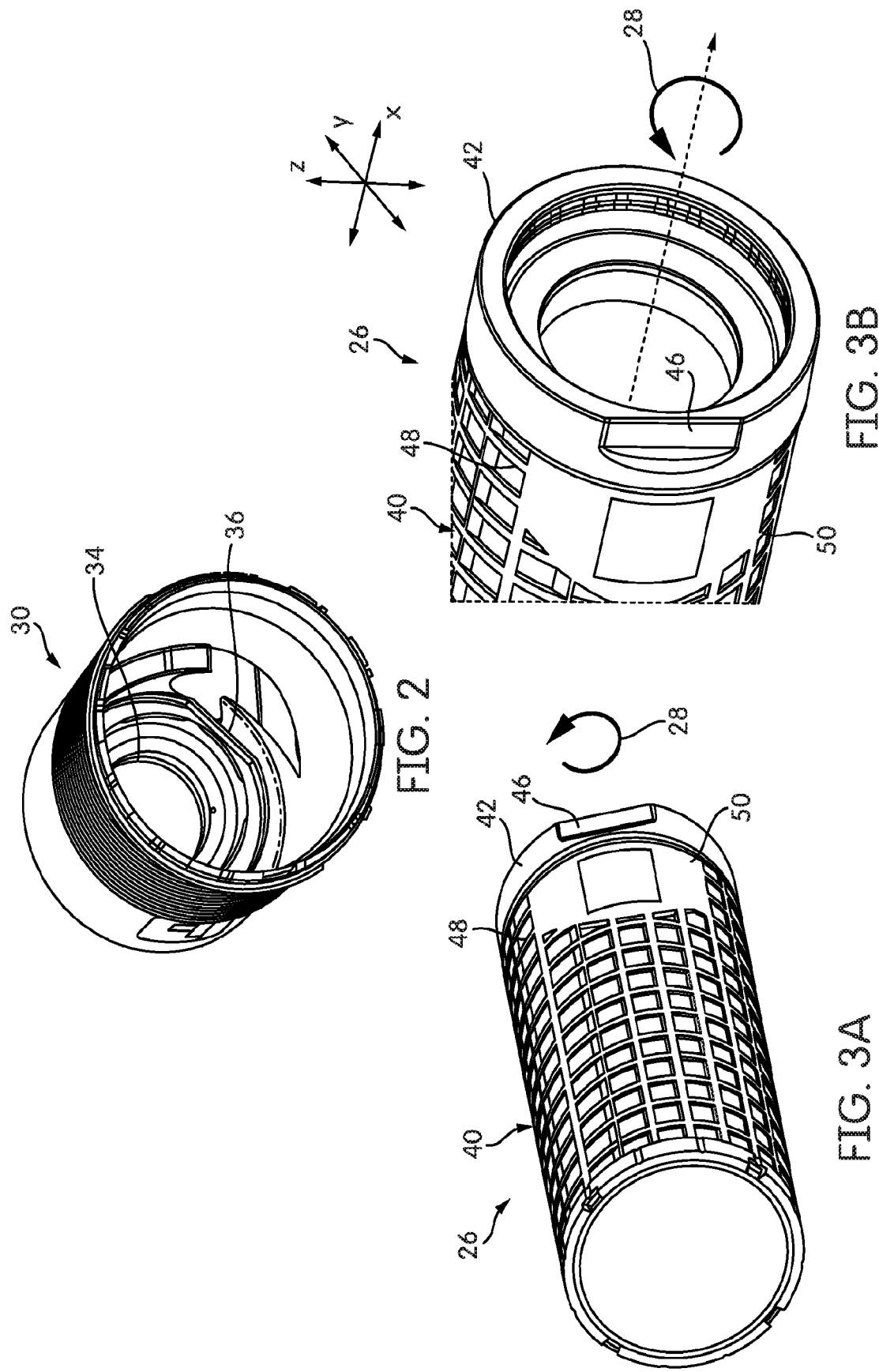

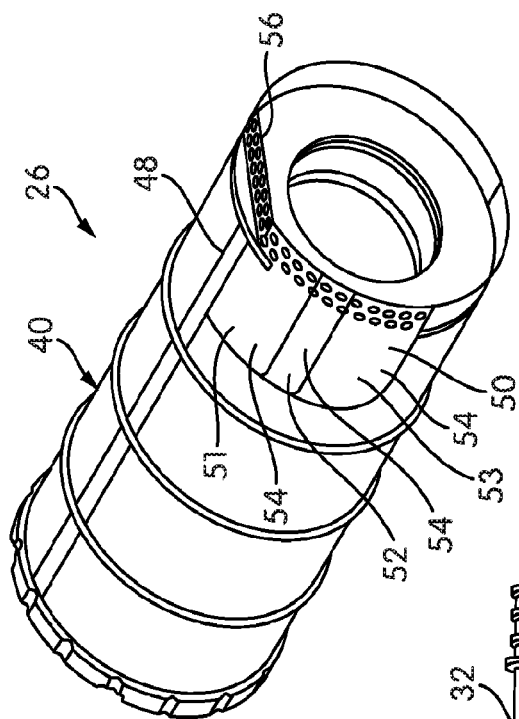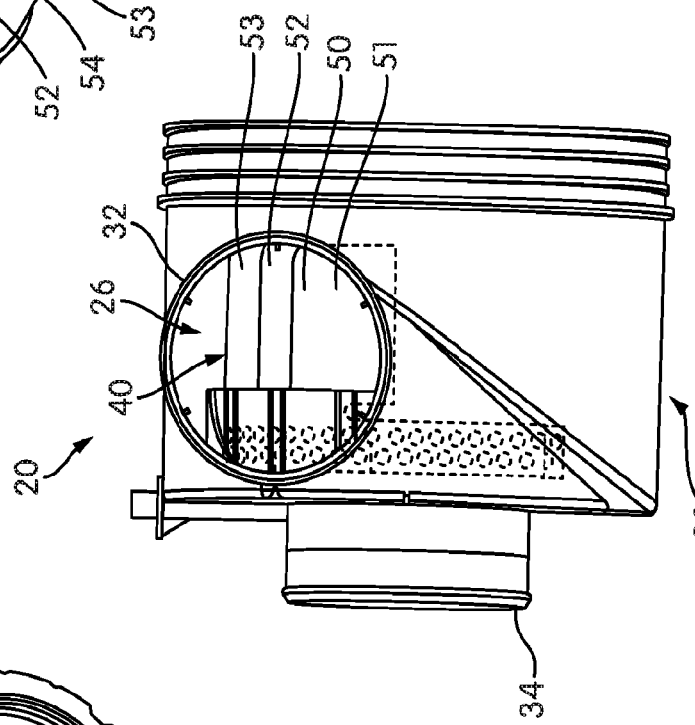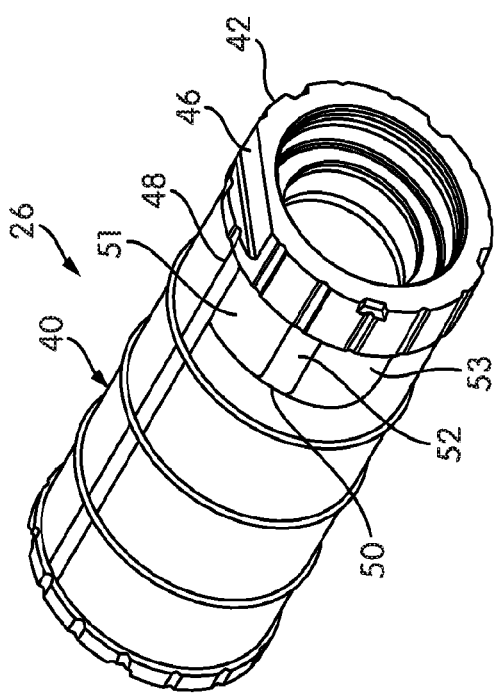
FIG. 4C
FIG. 4A
FIG. 4B

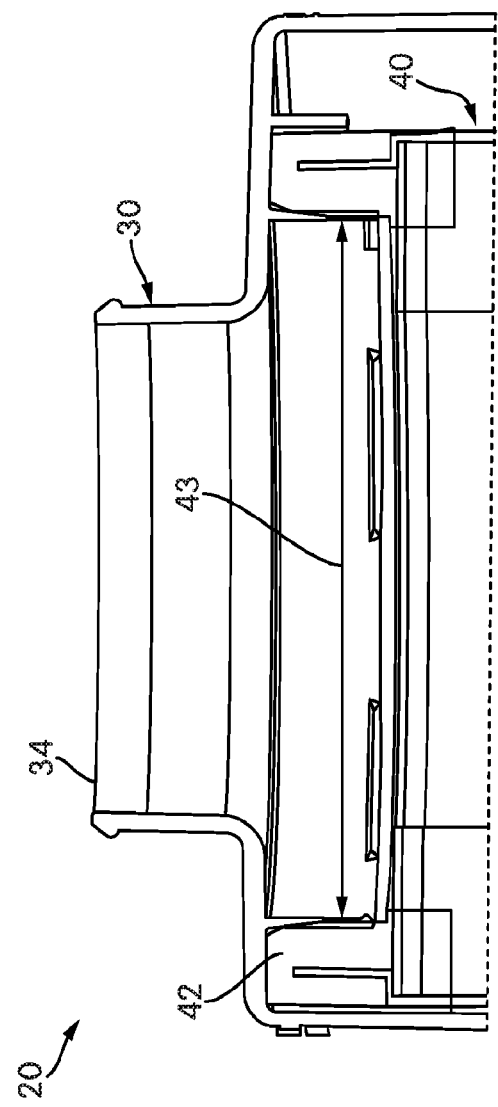

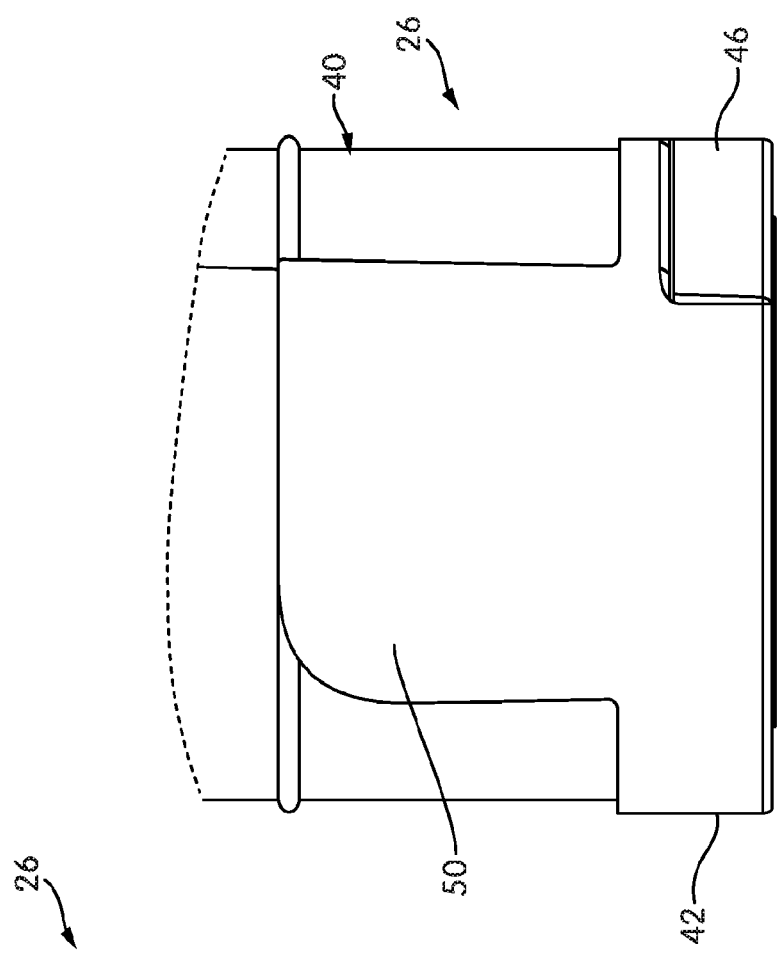
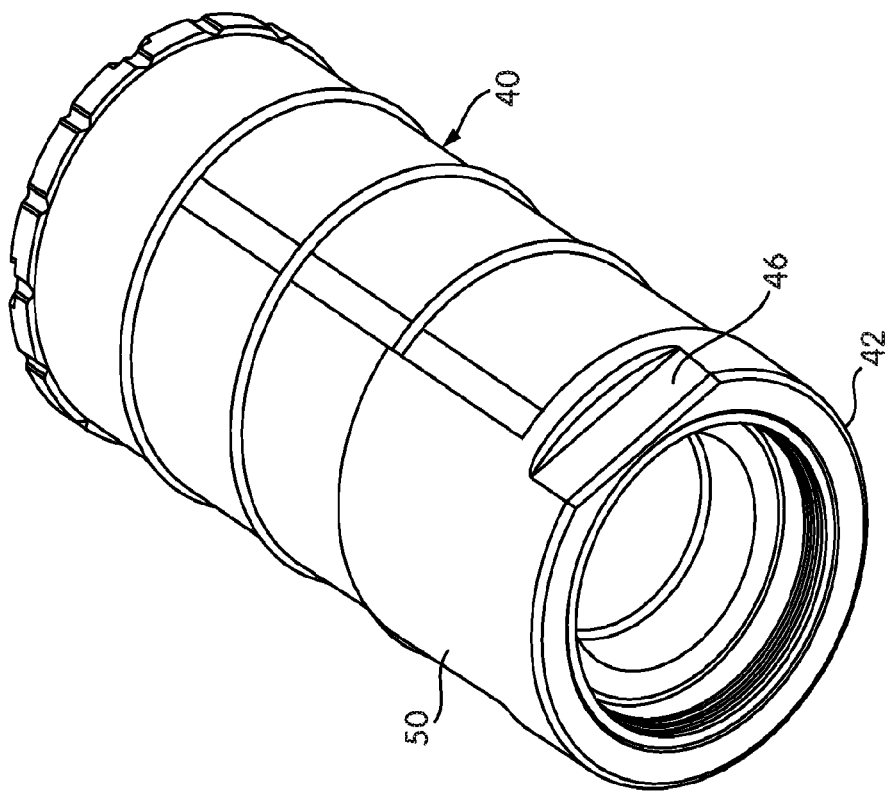

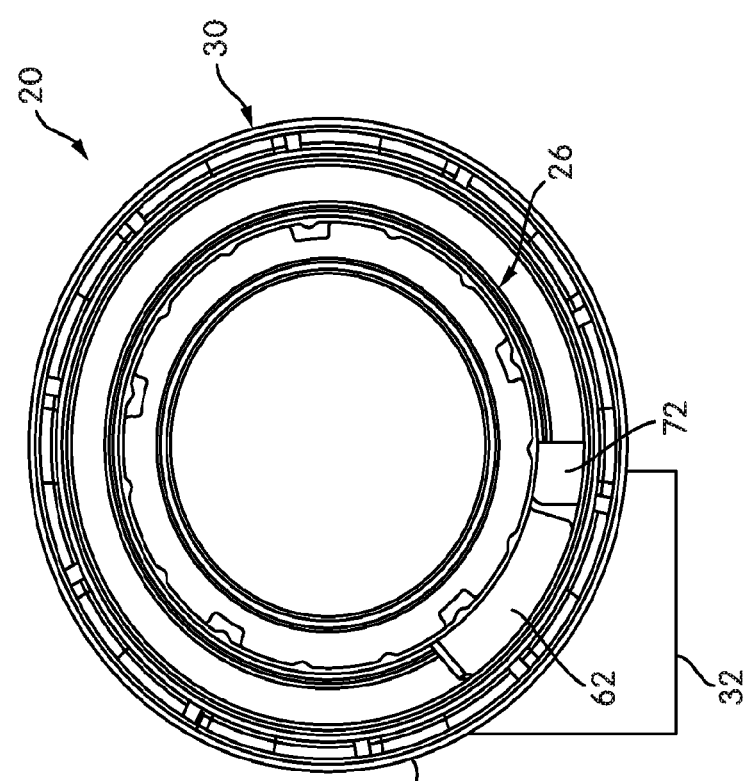
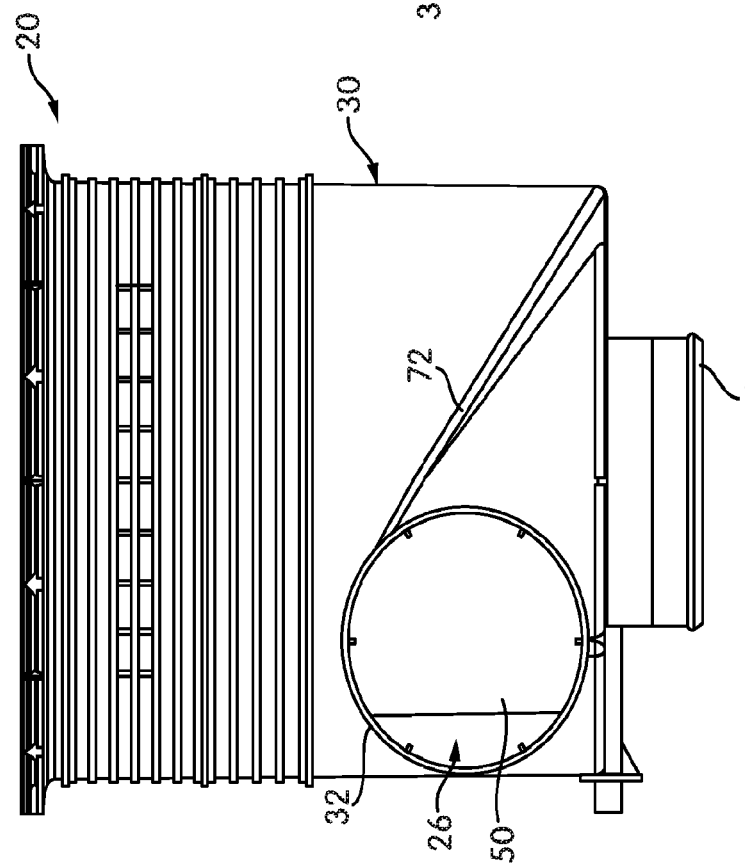
FIG. 11D
FIG. 11C

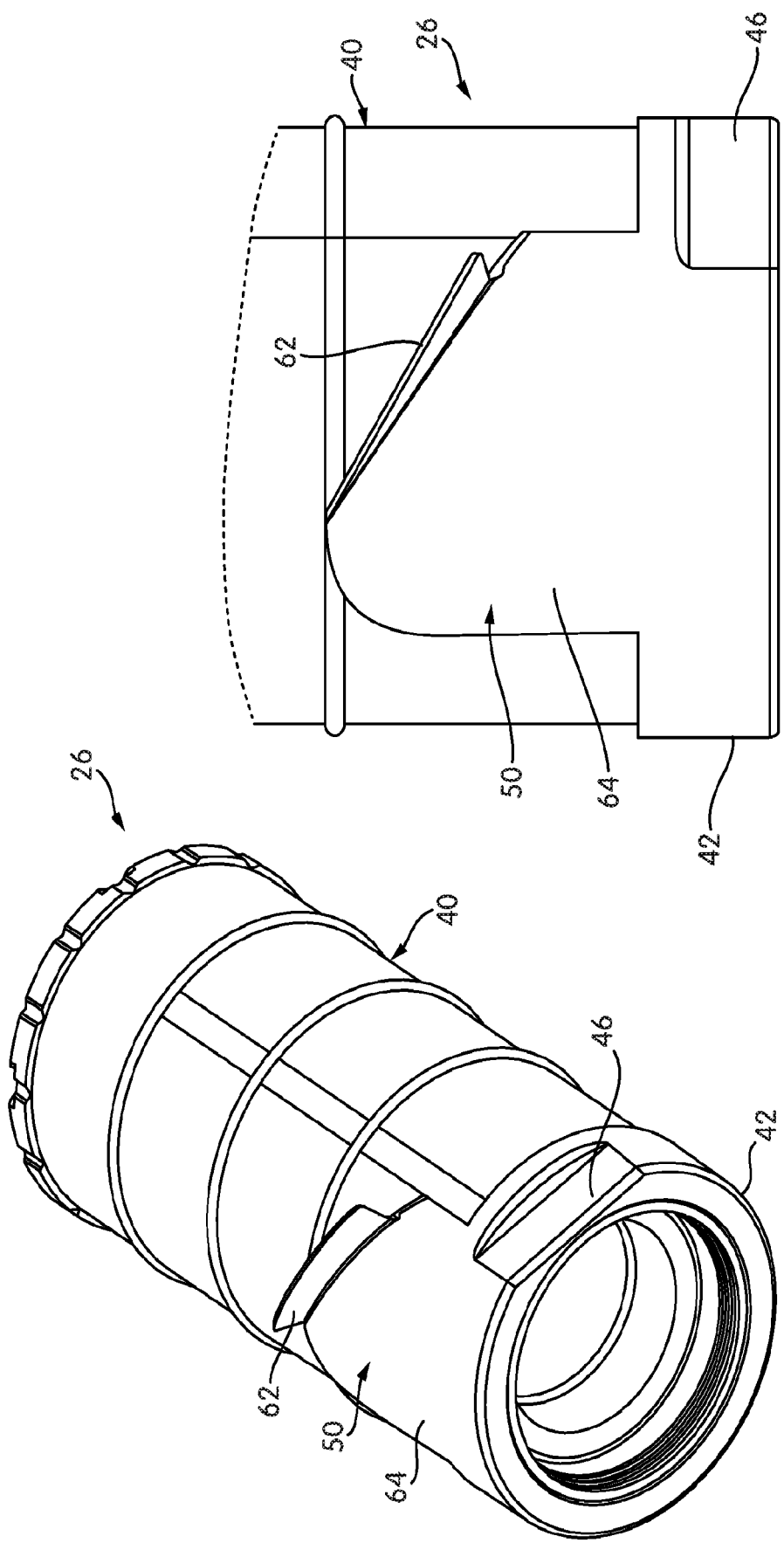

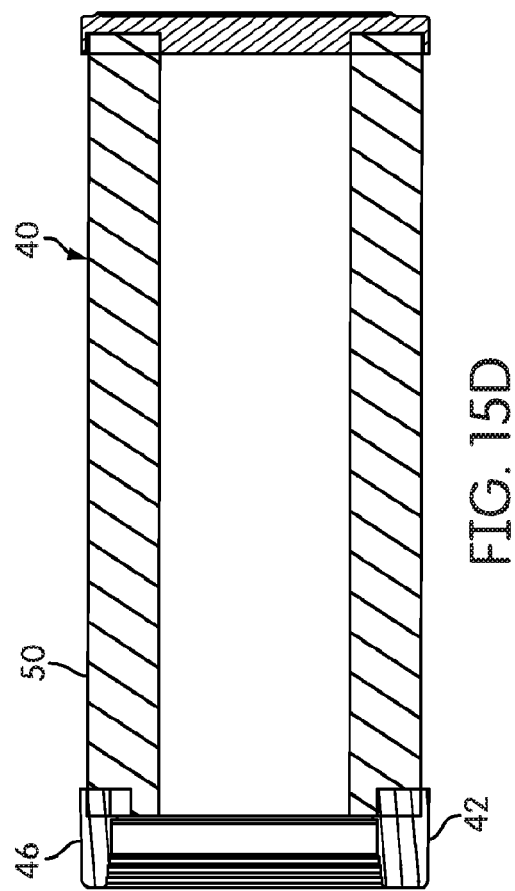
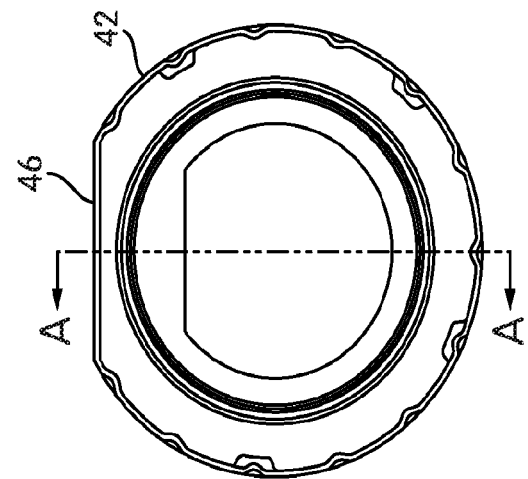
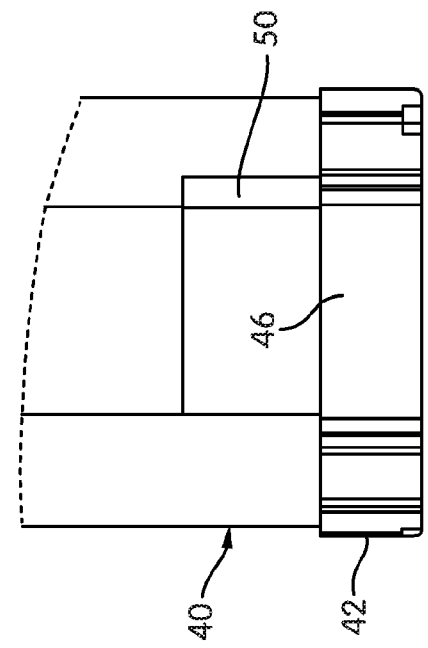
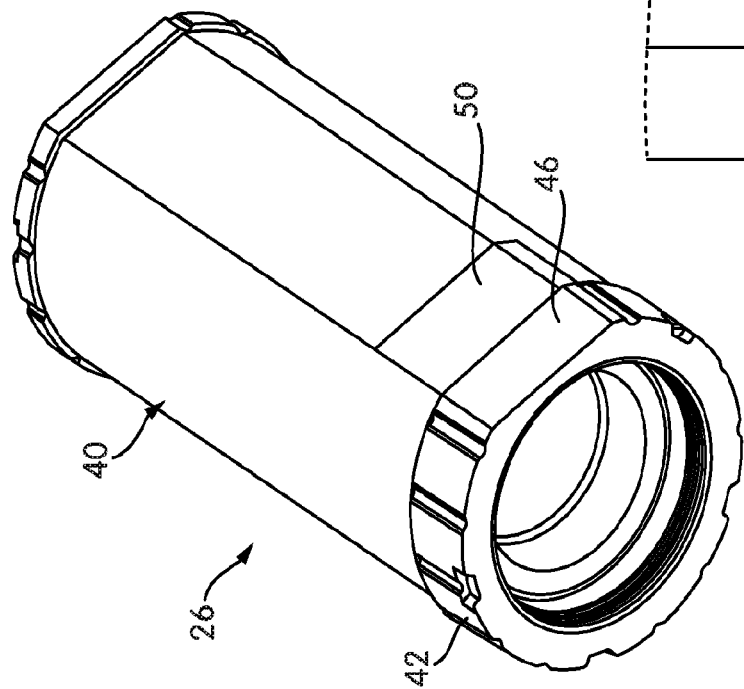

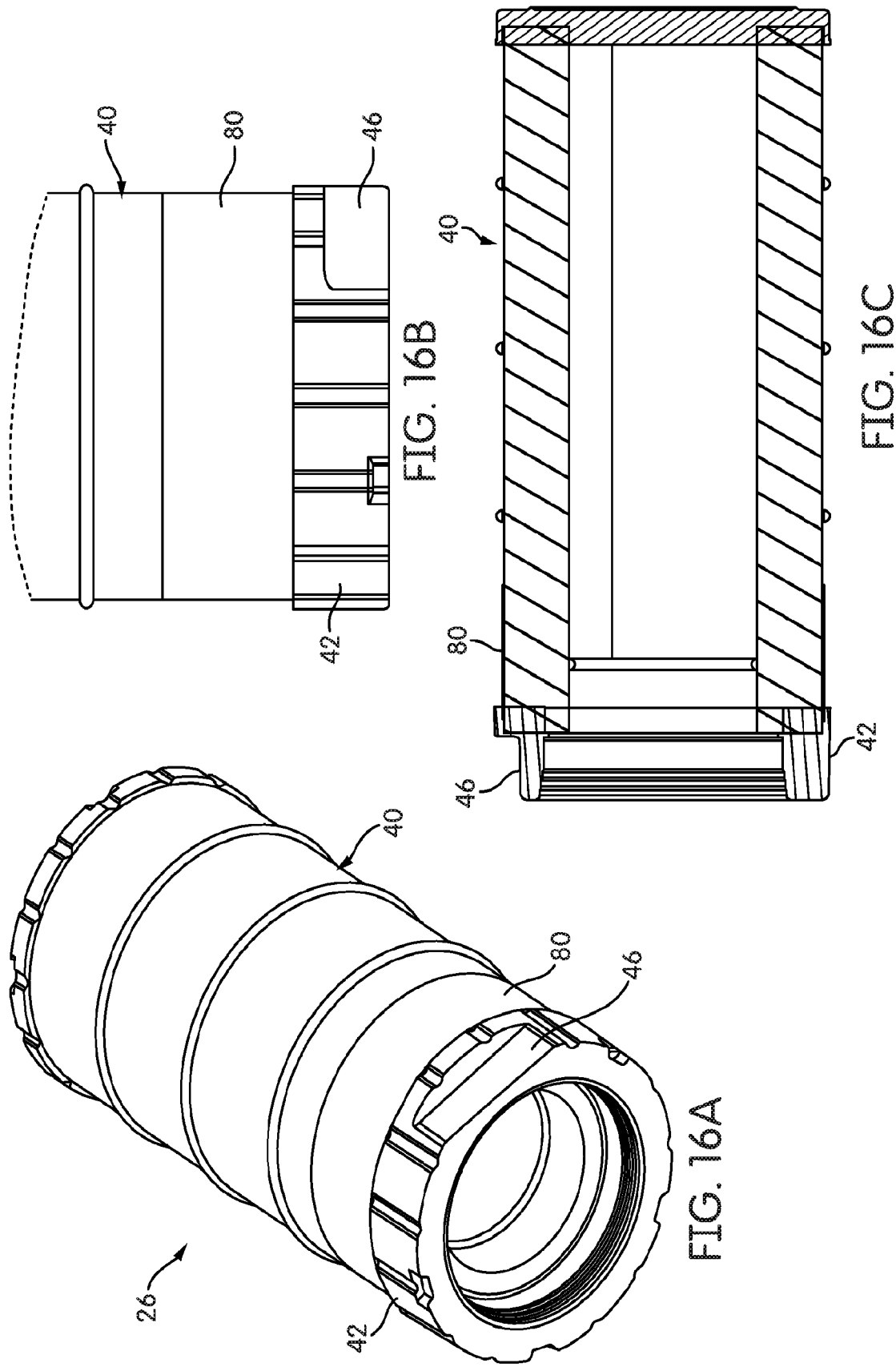

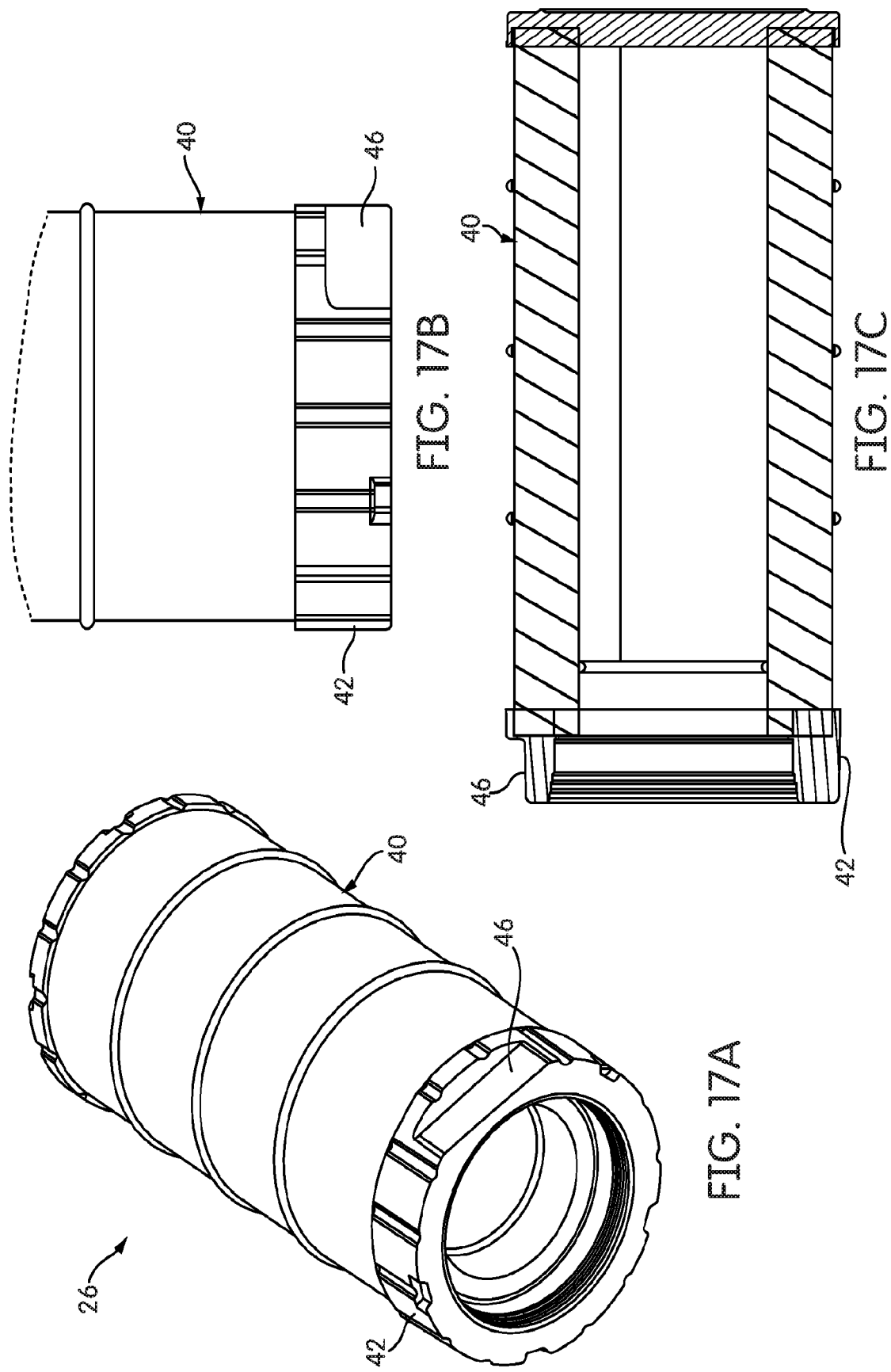

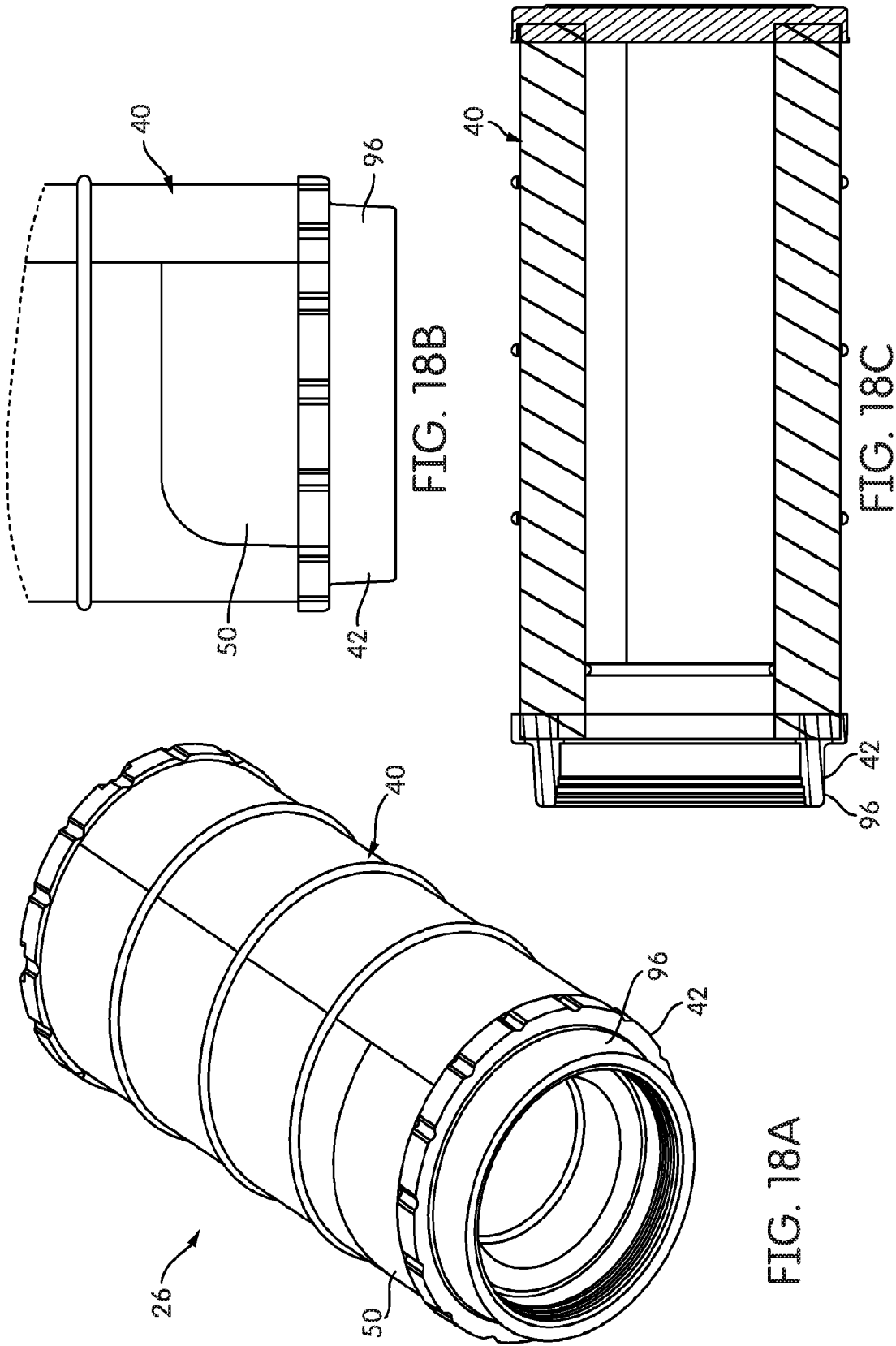

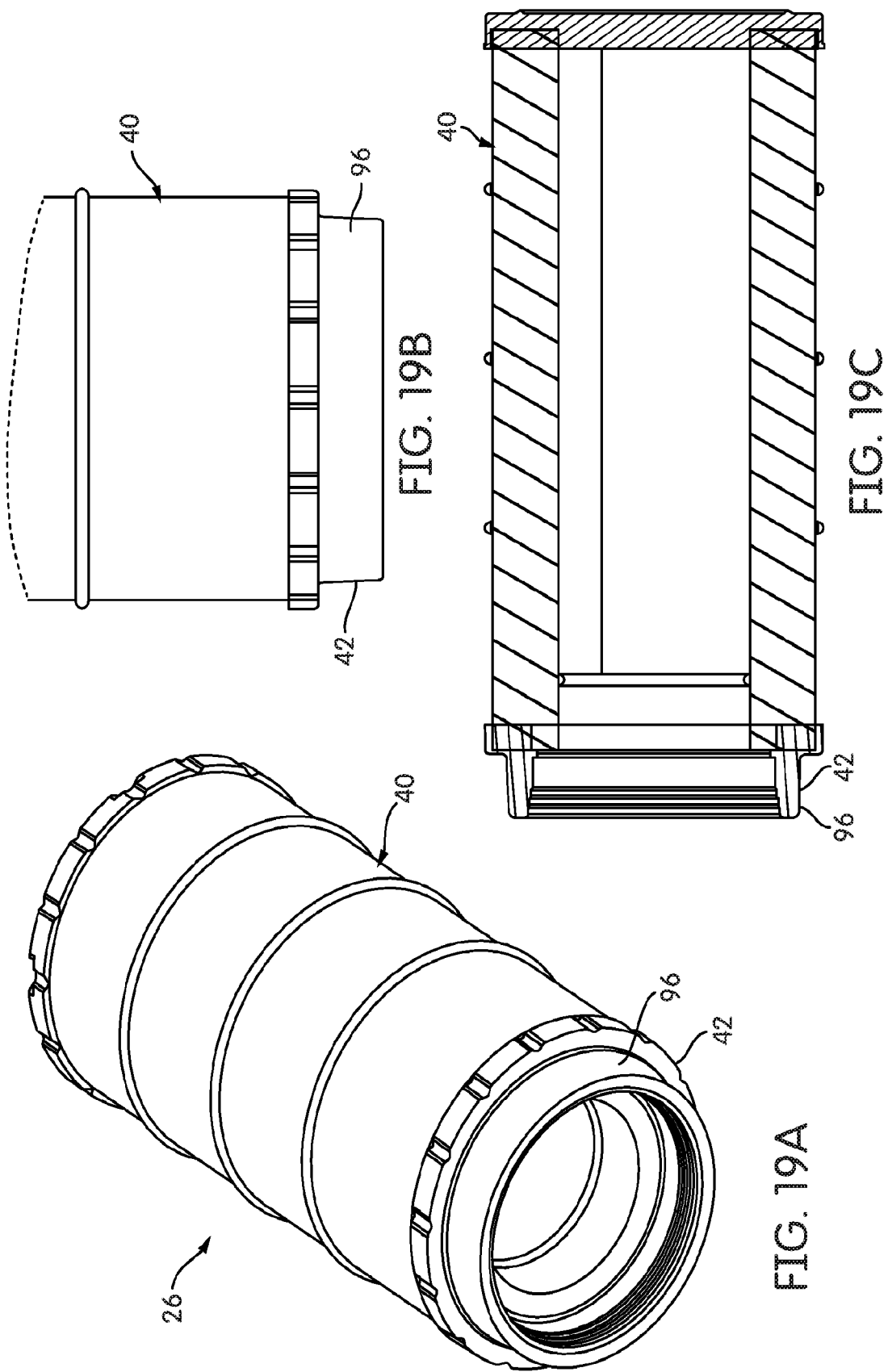

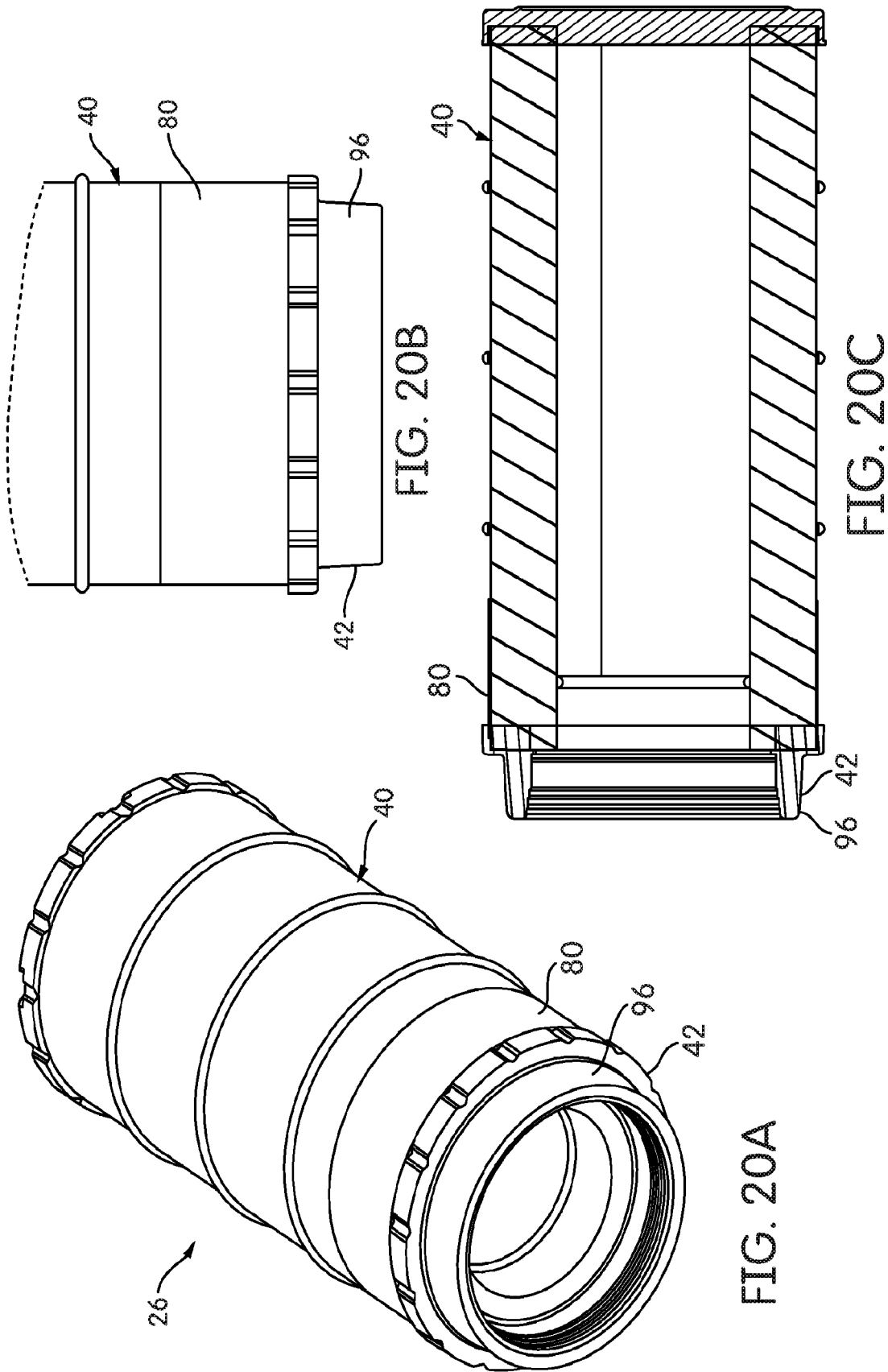

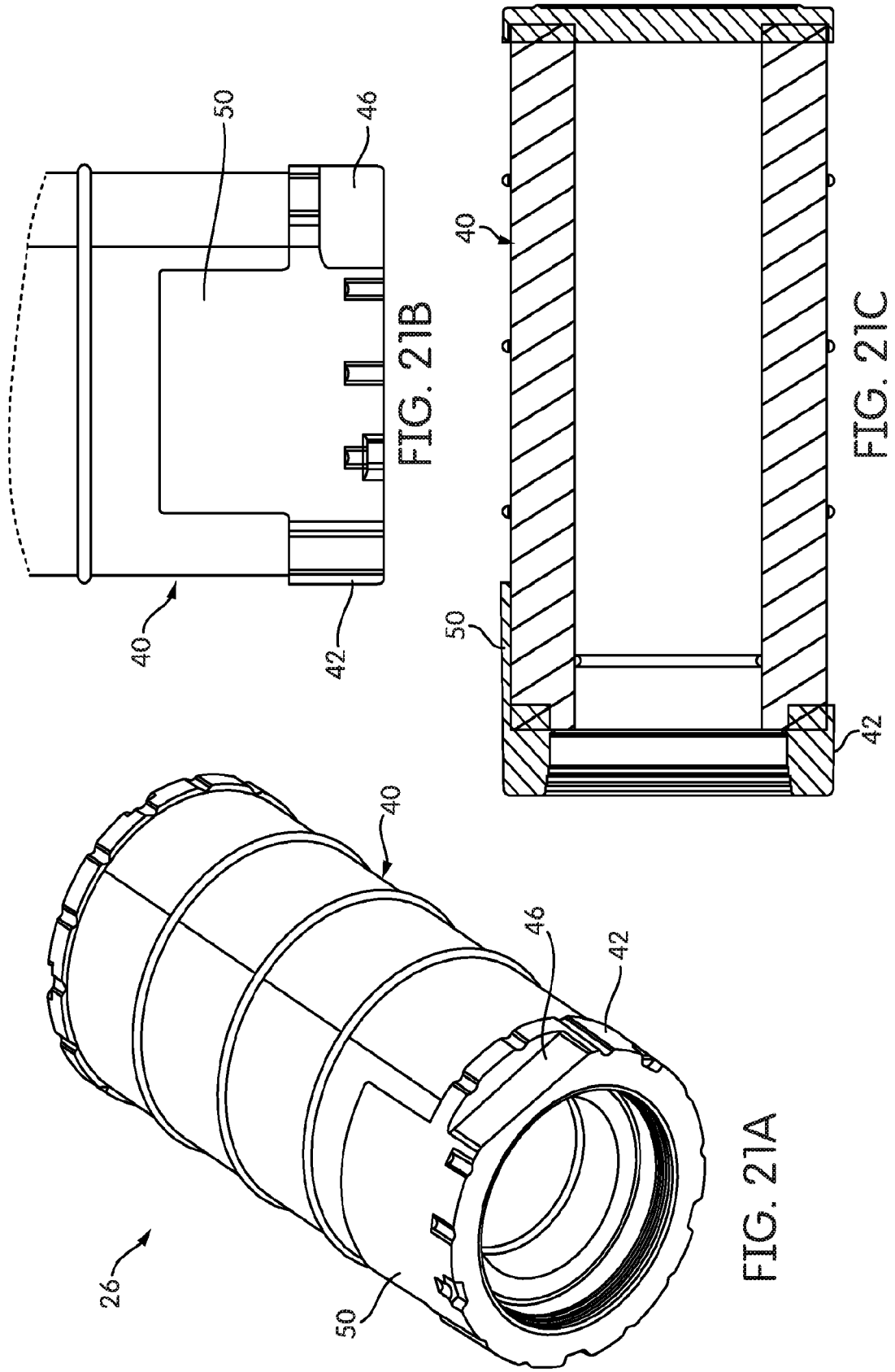

PRE-CLEANING AIR FILTER

CROSS REFERENCE TO RELATED APPLICATIONS

This application is a National Stage of PCT Application No. PCT/US2015/066579, filed Dec. 18, 2015, which claims priority to and benefit of U.S. Provisional Patent Application No. 62/094,314, filed Dec. 19, 2014. The contents of both applications are herein incorporated by reference in their entirety.

FIELD

The present application relates to filters configured to filter fluid such as air.

BACKGROUND

Air filters, such as pre-cleaning air filters, may direct the unfiltered air in order to obtain the optimal air filtration. Accordingly, the air filters may include a baffle ring that extends around the entire perimeter of the air filter. Alternatively, the air cleaner housing, which may hold the filter, may include an integrated baffle ring that wraps around the air filter. The baffle ring of current air filters completely covers the lower portion of the filter. In both such arrangements, however, a large portion of the filter is covered by the baffle ring. Therefore, the amount of easily accessed open filter media to the air flow is reduced, which increases the system restriction.

SUMMARY

Various embodiments provide for a filter element that includes a filter media, an end cap, and a baffle. The filter media is configured to be secured within a housing. The housing includes an inlet configured to accept a fluid for filtering and the filter media including a circumferential outer surface. The end cap is positioned at and coupled to one end of the filter media. The baffle is positioned relative to the filter media at a position such that, when the filter element is correctly installed within the housing, the baffle is proximate the inlet of the housing. The baffle extends around only a portion of the circumferential outer surface of the filter media in a radial direction.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1A is a top view of an air filter according to one embodiment.

FIG. 1B is a cross-sectional, front view of the air filter of FIG. 1A.

FIG. 2 is a front, perspective view of a housing that may be disposed within the air filter of FIG. 1A.

FIGS. 3A-3B are back perspective and front perspective views, respectively, of filter media that may be disposed within the air filter of FIG. 1A.

FIG. 4A is a top, partially see-through view of an air filter according to another embodiment.

FIGS. 4B-4C are front perspective views of filter media with and without an end cap, respectively, that may be disposed in the air filter of FIG. 4A.

FIG. 6 is a cross-sectional, side view of an air filter according to still another embodiment.

FIG. 8A is a perspective view of an air filter according to another embodiment.

FIG. 8B is a partial side view of the air filter of FIG. 8A.

FIG. 11C is a side view of the filter assembly of FIG. 11A.

FIG. 11D is a top view of the filter assembly of FIG. 11A.

FIG. 12A is a perspective view of a filter element that can be disposed in the air filter of FIG. 11A.

FIG. 12B is a partial side view of the filter element of FIG. 12A.

FIG. 15A is a perspective view of a filter element according to another embodiment.

FIG. 15B is a partial side view of the filter element of FIG. 15A.

FIG. 15C is a bottom view of the filter element of FIG. 15A.

FIG. 15D is a cross-sectional view along line A-A of FIG. 15C.

FIG. 16A is a perspective view of a filter element according to yet another embodiment.

FIG. 16B is a partial side view of the filter element of FIG. 16A.

FIG. 16C is a cross-sectional view of the filter element of FIG. 16A.

FIG. 17A is a perspective view of a filter element according to yet another embodiment.

FIG. 17B is a partial side view of the filter element of FIG. 17A.

FIG. 17C is a cross-sectional view of the filter element of FIG. 17A.

FIG. 18A is a perspective view of a filter element according to still another embodiment.

FIG. 18B is a partial side view of the filter element of FIG. 18A.

FIG. 18C is a cross-sectional view of the filter element of FIG. 18A.

FIG. 19A is a perspective view of a filter element according to yet another embodiment.

FIG. 19B is a partial side view of the filter element of FIG. 19A.

FIG. 19C is a cross-sectional view of the filter element of FIG. 19A.

FIG. 20A is a perspective view of a filter element according to yet another embodiment.

FIG. 20B is a partial side view of the filter element of FIG. 20A.

FIG. 20C is a cross-sectional view of the filter element of FIG. 20A.

FIG. 21A is a perspective view of a filter element according to still another embodiment.

FIG. 21B is a partial side view of the filter element of FIG. 21A.

FIG. 21C is a cross-sectional view of the filter element of FIG. 21A.

DETAILED DESCRIPTION OF VARIOUS EMBODIMENTS

Figure 5A:
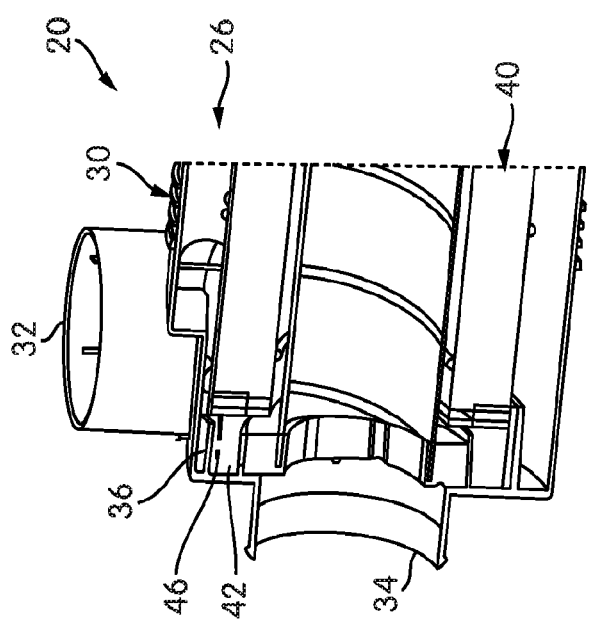
FIG. 5A is a cross-sectional, perspective view of an air filter according to yet another embodiment.

Referring to the figures generally, the various embodiments disclosed herein relate to an air filter with a localized baffle. More specifically, mechanisms described herein may reduce the restriction of air flow through the filter and may improve the pre-cleaning performance of the housing of the filter which can increase the useful life of the filter assembly.

Air Filter

Referring now to FIGS. 1A-1B, there is shown an air filter 20 according to one embodiment. The air filter 20 may be, for example, a pre-cleaning air filter and/or a tangential air cleaner. Although an air filter is referred to at various locations herein, it is understood that the air filter 20 may not be limited to air, but may be used with other fluids, such as liquids.

The air filter system or assembly 20 of FIGS. 1A-1B includes a housing 30 and a filter element 26. The filter element 26 includes a filter media 40, an end cap 42, and a baffle 50. The housing 30 (as shown in FIG. 2) is used to house, protect, receive and/or secure the filter media 40. The filter media 40 (as shown in FIGS. 3A-3B) is used to filter the fluid (e.g., air or liquid) that flows through the air filter 20 and may include pleats. Accordingly, the filter media 40 is positioned and secured within the housing 30, as shown in FIGS. 1A-1B.

Housing

As shown in FIGS. 1A-1B, the housing 30 includes an inlet 32 and an outlet 34, which may be integrated into the walls of the housing 30 according to one embodiment. The inlet 32 and the outlet 34 are configured to accept a fluid to be filtered and release the filtered fluid. For example, the air may flow into the air filter 20 and within the housing 30 through the inlet 32, into the filter media 40 to be filtered, and out of the housing 30 (and the air filter 20) through the outlet 34.

Filter Assembly

The filter assembly 26 includes a filter media 40, an end cap 42, and a baffle 50. The filter media 40 may be in a variety of different shapes, according to the desired configuration. For example, the filter media 40 may be cylindrical or may have a D-shaped cross-section (e.g., circular around a first portion of the circumference and flat or straight along a second portion of the circumference as shown, for example, in FIGS. 15A-15D). For example, the filter media disclosed in Patent Application No. PCT/US2015/029443, the entire disclosure of which is incorporated by reference herein in its entirety, can be used within the filter assembly 26.

The filter media cap, a filter seal ring, a bottom ring, or end cap 42 (as shown, for example, in FIGS. 1B and 3A-3B) to help seal the filter media 40 and the housing 30 together. The end cap 42 is positioned at and coupled to one end of the filter media 40.

The end cap 42 may have a rigid outer section or portion 41 and a soft or pliable inner section or portion 45 (e.g., a soft seal). The rigid portion 41 may provide a secure attachment to the filter media 40. The pliable portion 45 may be used to completely seal portions of the filter media 40 and secure to other components, such as the housing 30.

Figure 7B:
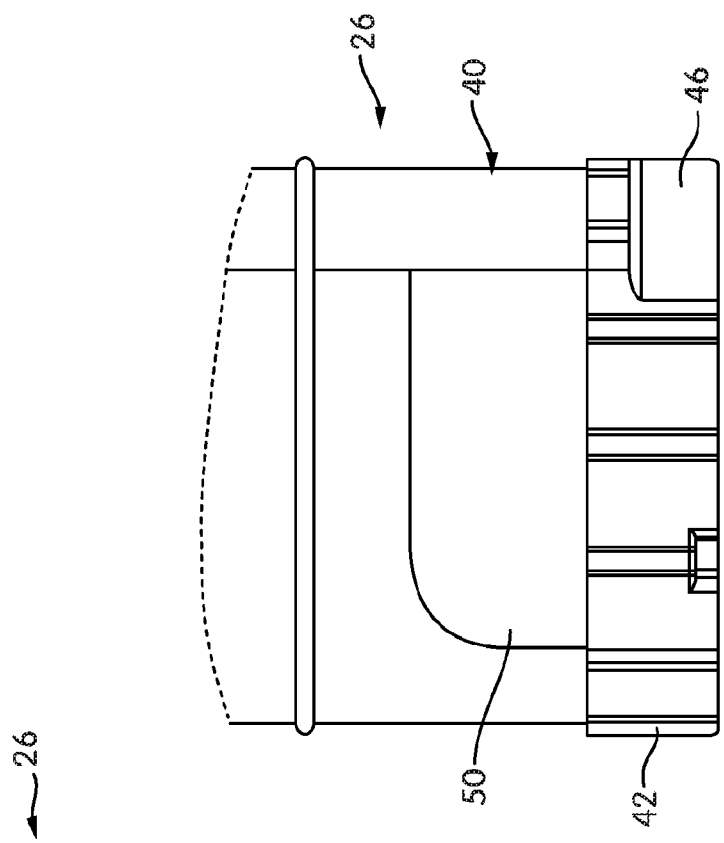
FIG. 7B is a partial side view of the air filter of FIG. 7A.
Figure 7A:
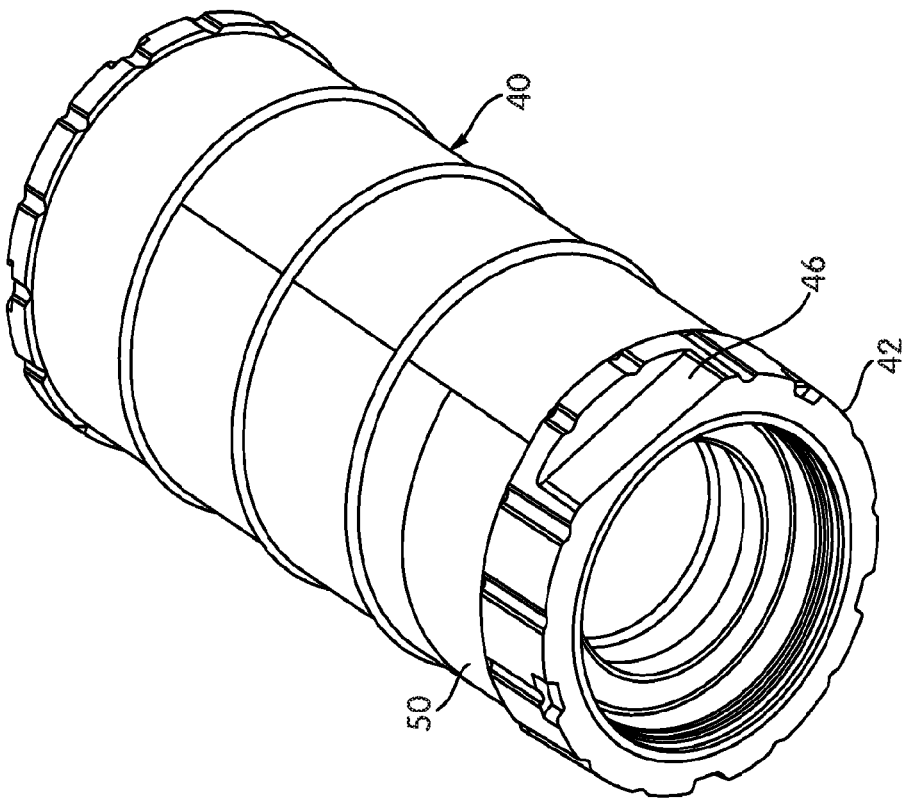
FIG. 7A is a perspective view of an air filter according to yet another embodiment.
Figure 7C:
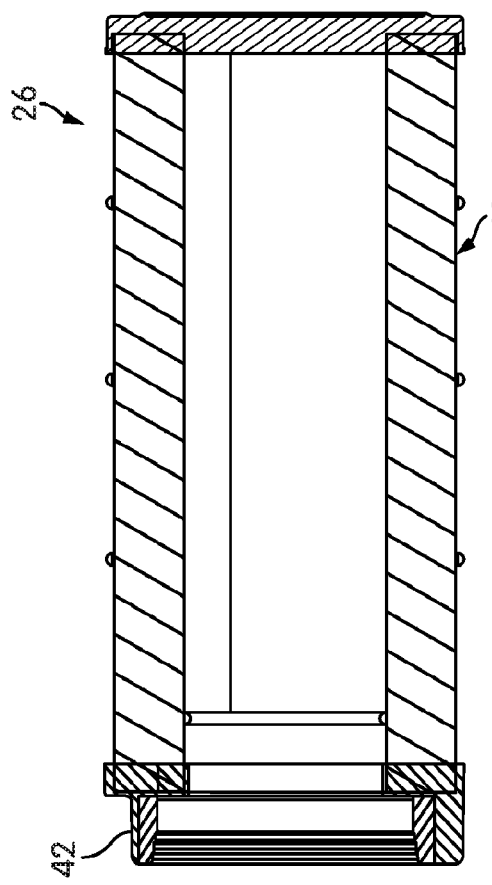
FIG. 7C is a cross-sectional view of the filter of FIG. 7A.
Figure 7D:
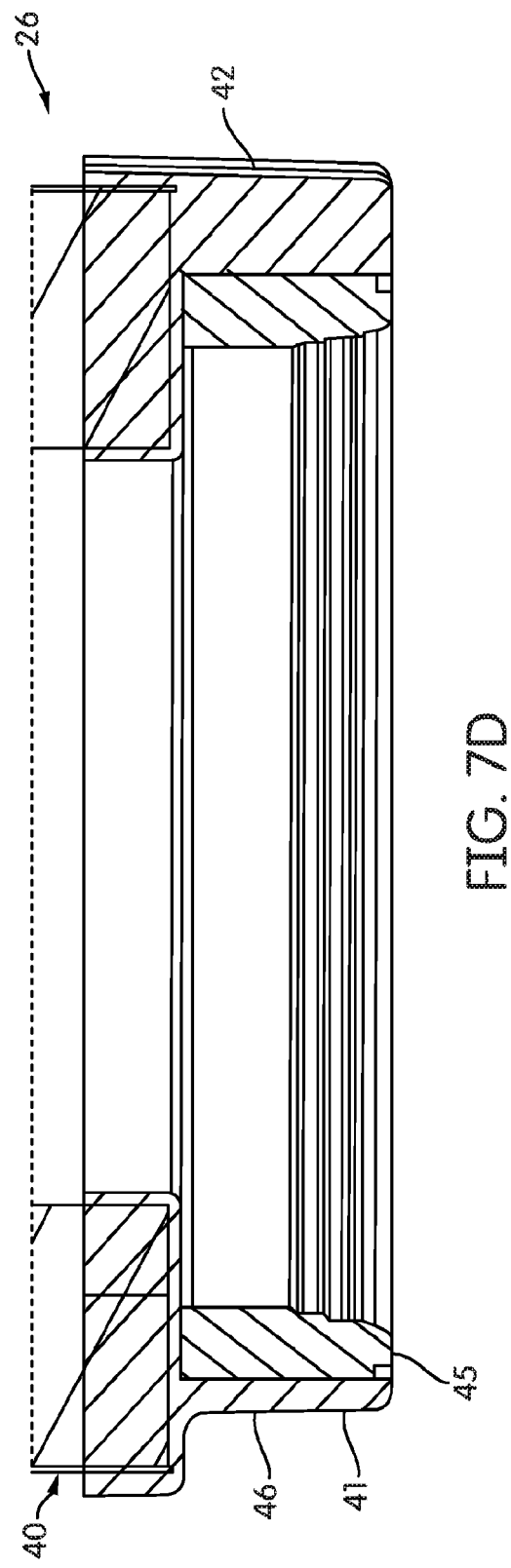
FIG. 7D is an enlarged, partial cross-sectional view of the filter of FIG. 7A.
Figure 8C:
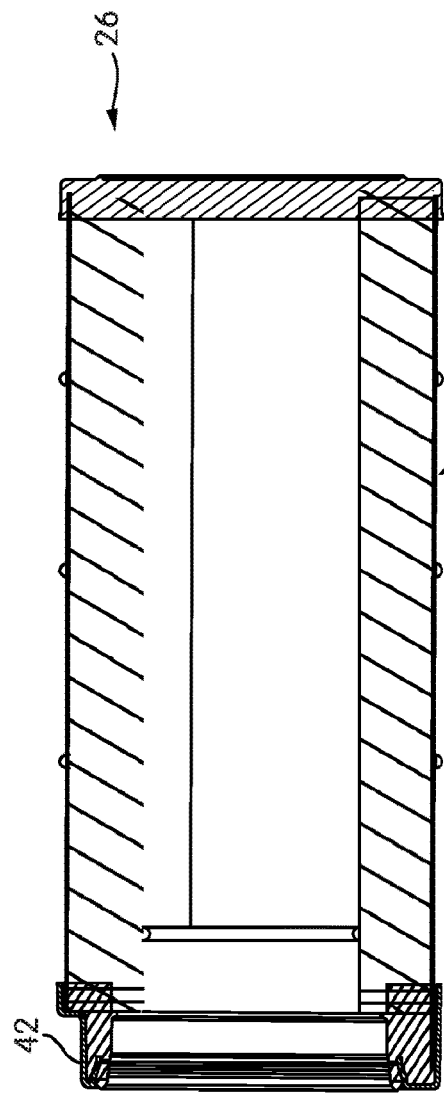
FIG. 8C is a cross-sectional view of the filter of FIG. 8A.
Figure 8D:
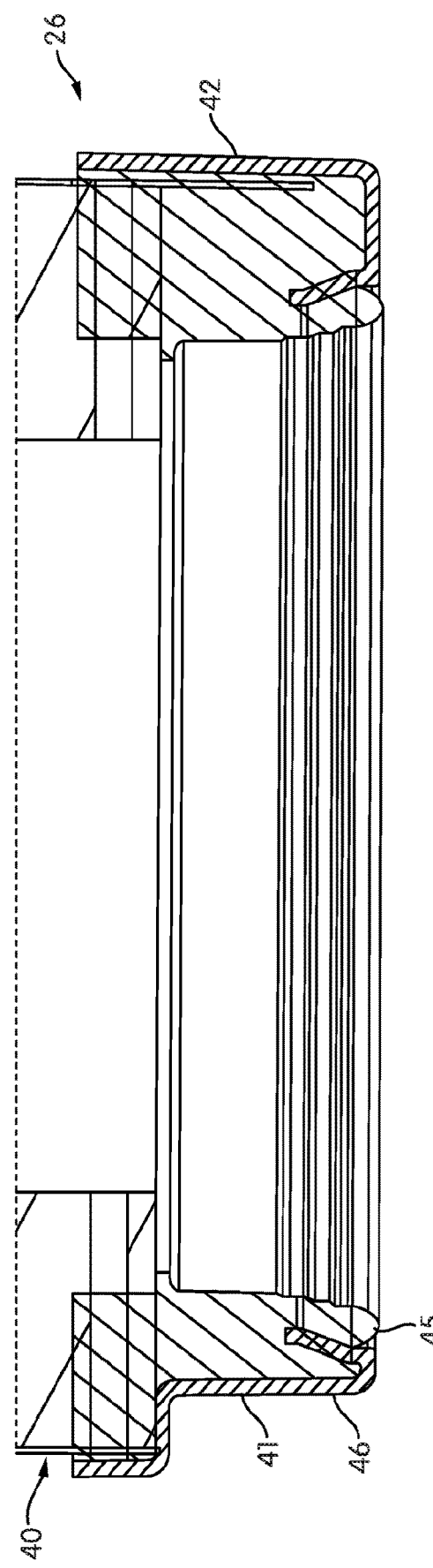
FIG. 8D is an enlarged, partial cross-sectional view of the filter of FIG. 8A.

Various embodiments depict different configurations of the rigid portion 41 and the pliable portion 45 of the end cap 42 and the attachment of the end cap 42 to the filter media 40. For example, as shown in FIGS. 7C-7D, the rigid portion 41 extends into the inside region of the filter media 40 such that the rigid portion 41 covers a portion of the inner circumference of the filter media 40. The rigid portion 41 also extends around the outside of the filter media 40 and accordingly covers or surrounds a portion of the outer circumference of the filter media 40. The rigid portion 41 also completely covers the end of the filter media 40. The rigid portion 41 includes an extension that extends from the end of the filter media 40. The pliable portion 45 covers an inner circumference of the extension of the rigid portion 41 to provide an area for the filter assembly 20 to seal to other components.

According to another embodiment as shown in FIGS. 8C-8D and 12C-12D, the rigid portion 41 extends around the outside of the filter media 40 and accordingly covers or surrounds a portion of the outer circumference and a first portion of the end of the filter media 40. The rigid portion 41 also includes an extension that extends from the end of the filter media 40. The pliable portion 45 covers an inner circumference of the extension of the rigid portion 41. Neither the rigid portion 41 nor the pliable portion 45 covers the entire end of the filter media 40. Furthermore, neither the rigid portion 41 nor the pliable portion 45 extend into the inside region of the filter media 40 and accordingly do not cover any portion of the inner circumference of the filter media 40. Accordingly, a second portion of the end of the filter media 40 is exposed. In order to form the end cap 42 of FIG. 8D, the rigid portion 41 may be placed into a mold to form the shape of and attach with the pliable portion 45.

Figure 9:
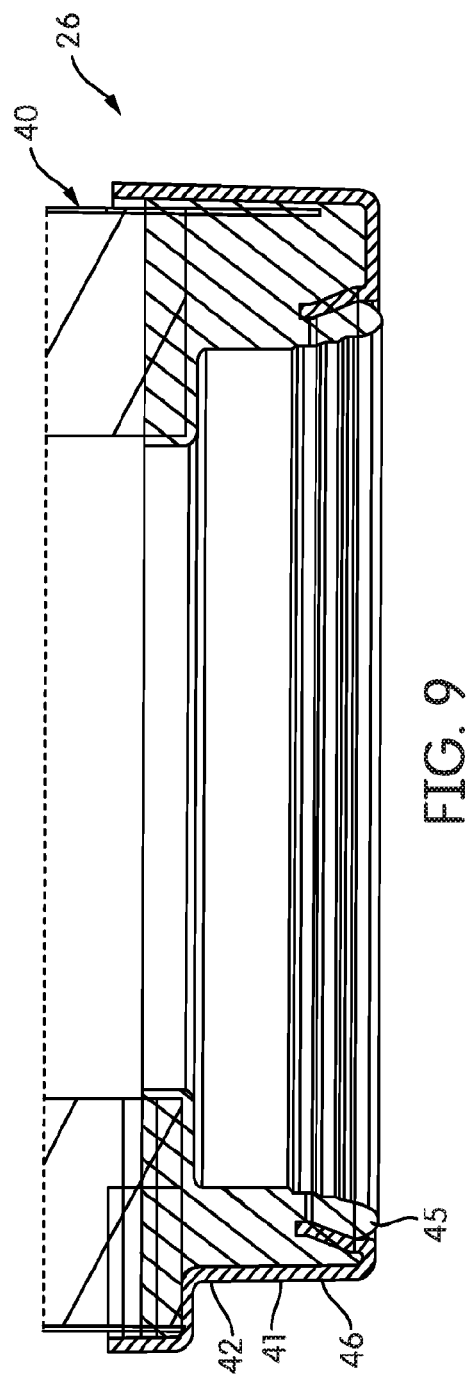
FIG. 9 is an enlarged, partial cross-sectional view of an air filter according to still another embodiment.
Figure 13:
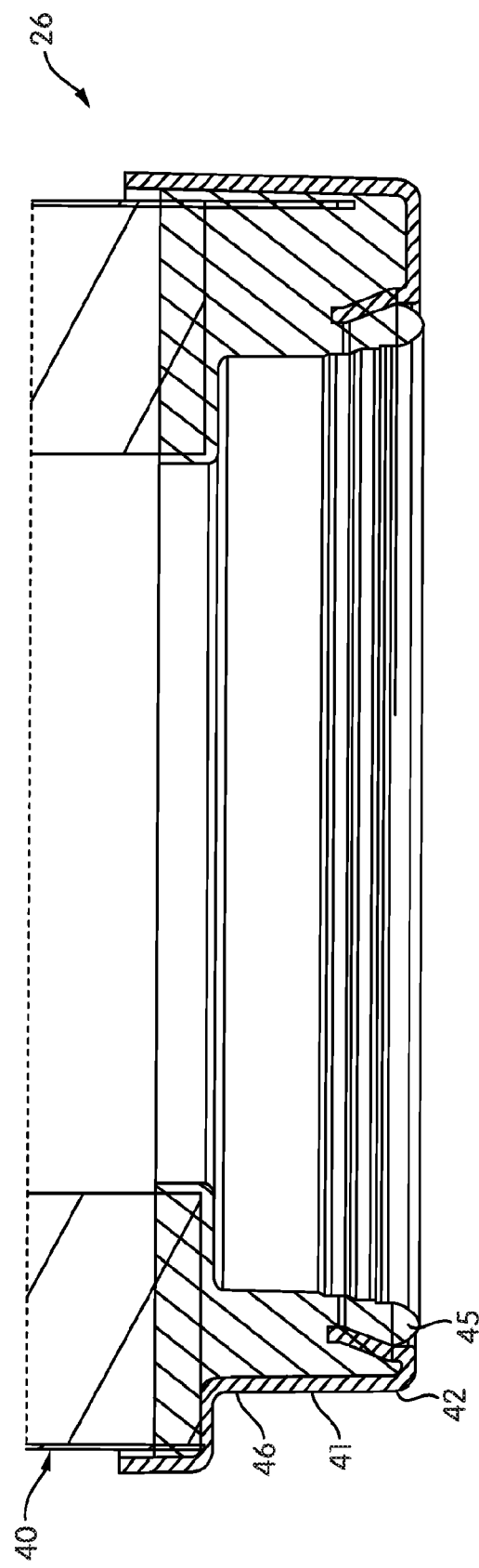
FIG. 13 is an enlarged, partial cross-sectional view of an air filter according to another embodiment.

According to yet another embodiment as shown in FIGS. 9 and 13, the rigid portion 41 extends around the outside of the filter media 40 and accordingly covers or surrounds a portion of the outer circumference of the filter media 40 and includes an extension that extends from the end of the filter media 40. The pliable portion 45 extends into the inside region of the filter media 40 and accordingly a portion of the pliable portion 45 is positioned along an inner circumference of the extension of the rigid portion 41 and covers a portion of the inner circumference of the filter media 40. The pliable portion 45 also covers or surrounds the entire end of the filter media 40. Accordingly, the end of the filter media 40 is not exposed and is completely covered by the pliable portion 45.

As shown in FIGS. 8D, 9, 12D, and 13, the pliable portion 45 may further include an extension that extends from the end of the filter media 40 alongside the extension of the rigid portion 41. In order to attach the rigid portion 41 and the pliable portion 45 together, the rigid portion 41 may include a protrusion that protrudes upwardly into and is covered or surrounded by the extension of the pliable portion 45.

Figure 10:
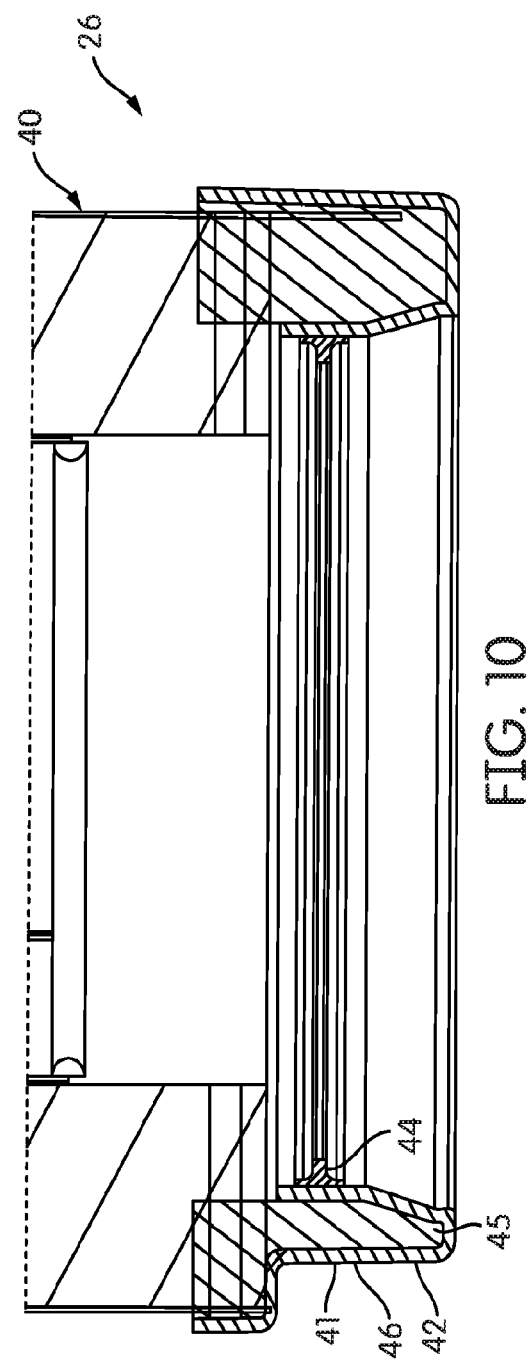
FIG. 10 is an enlarged, partial cross-sectional view of an air filter according to another embodiment.

According to still another embodiment as shown in FIG. 10, the pliable portion 45 covers or surrounds a portion of the outer circumference and a portion of the end of the filter media 40. The pliable portion 45 includes an extension that extends from the end of the filter media 40. The rigid portion 41 substantially covers or surrounds any exposed portions of the pliable portion 45 that are along the sides (e.g., on the sides of the pliable portion 45 or on the end of the pliable portion 45 that is not connected to the filter media 40). Accordingly, the rigid portion 41 extends along the portion of the outer circumference of the filter media 40, along the inner and outer circumference of the extension of the pliable portion 45, and along the end of the extension of the pliable portion 45. Neither the rigid portion 41 nor the pliable portion 45 cover the entire end of the filter media 40 and do not cover any portion of the inner circumference of the filter media 40. Accordingly, a portion of the filter media 40 is exposed.

As shown in FIG. 10, an overmolded wiper seal 44 is included and positioned along the entire inner circumference of the rigid portion 41 to help seal the filter media 40 to various components and prevent leakage. The seal 44 extends radially around a center axis of the filter media 40, thereby reducing the inner diameter of the opening leading to the filter media 40. The seal 44 may be constructed out of various materials, including but not limited to overmolded rubber.

The rigid portion 41 and the pliable portion 45 may be constructed out of a variety of materials, including but not limited to urethane or polyurethane.

According to one embodiment as shown in FIGS. 3A-3B and 4B-4C, the filter media 40 of the filter element 26 includes a circumferential outer wrap or outer surface 48 that extends around the perimeter of the filter media 40 such that the filter media 40 is under the outer surface 48. The circumferential outer surface 48 is located by at least the inlet 32 of the housing 30 and is in the line of the incoming air flow. The outer surface 48 may be the outside surface of the actual filter media such that the actual filter media is directly exposed within the housing 30. Alternatively, the outer surface 48 may include a separate covering or wrap that extends around the outside surface of the actual filter media such that the actual filter media is covered within the housing 30.

Baffle

According to one embodiment and as further shown in the figures, a local baffle section or baffle 50 is positioned relative to the filter media 40 proximate the inlet 32 of the housing 30. In one embodiment, the baffle 50 may be integrated with or otherwise coupled to the filter media 40 itself. Alternatively, the baffle 50 may be integrated with or otherwise coupled to the end cap 42. In any of these particular implementations, however, when the filter element 26 is correctly installed and aligned within the housing 30, the incoming air flow 22 enters through the inlet 32, directly contacts the baffle 50, and is thereby initially directed into a particular direction (e.g., a pre-cleaning direction) with respect to the filter media 40 before entering and being filtered by the filter media 40. The baffle 50 may be positioned proximate the end cap 42.

The local baffle 50 improves the overall system performance of the air filter 20, while maintaining, or even reducing, the package size of the air filter 20. According to one embodiment, the baffle 50 may improve pre-cleaning functionality and performance of the air filter 20. As shown in FIG. 1B, for example, as the air first enters the air filter 20, the air first hits the baffle 50, which directs the air flow 22 to the inner surface of the outer wall of the air filter 20 (e.g., a sidewall 39 of the housing 30), thus causing the air flow 22 to flow around the filter media 40 and creating a centrifugal force before the air goes through the filter media 40. This centrifugal force helps to pre-clean the air before going through the filter media 40 and allows for larger particulate separation. The baffle 50 may also be used for water separation by preventing water entering into the air filter 20 from going directly into the filter media 40.

The baffle 50 may extend around a section of the perimeter (rather than the entire perimeter) of the circumferential outer surface 48 of the filter media 40 and may protrude from the end cap 42 along the length of the filter media 40. For example, the baffle 50 extends around only a portion of the circumferential outer surface 48 in the radial direction 28, as shown in FIGS. 3A-3B, such that the baffle 50 does not wrap around the entire circumferential outer surface 48. Accordingly, the baffle 50 extends in the radial direction 28 around the circumferential outer surface 48 less than 360 degrees around the filter media 40, which may be a variety of shapes, for example being cylindrical in shape or having a "race track" or a D-shaped cross-section as shown, for example, in FIGS. 15A-15D. The length of the baffle along the axial direction (e.g., along the x-axis, as shown in FIG. 3B) on the filter media 40 may vary according to the desired configuration. By integrating or positioning the baffle 50 into or onto a local region of the filter media 40, rather than using a baffle ring that wraps around the entire perimeter of the filter media 40, the flow restriction of the air filter 20 is reduced by increasing the amount of filter media 40 available for filtering. More specifically, since the size of the baffle 50 is reduced and the air flow 22 is only blocked by the smaller and local baffle 50, the amount of filter media 40 that is open, uncovered, and available for filtering air is maximized. Accordingly, only the area of the filter media 40 that is in the line of flow at the inlet 32 is blocked by the baffle 50. The baffle 50 may be curved about the perimeter of the filter media 40. For example, the baffle 50 may match the curvature of the filter media 40.

As shown in FIGS. 1A-1B, the baffle 50 is located in a local region to the inlet 32 on the filter media 40. Accordingly, when the filter element 26 is installed correctly within the housing 30, the baffle 50 is positioned directly across from, located near, and proximate to the inlet 32 of the housing 30. For example, the baffle 50 may be positioned on the same side and end of the filter element 26 as the inlet 32. Furthermore, the baffle 50 may be on an opposite side of the filter element 26 as a Dust Ejection Valve (DEV) port and an air filter outlet of the housing 30 (where the DEV port and the air filter outlet are near or next to each other). Although the baffle 50 is shown in a local region to the inlet 32, it is anticipated that the baffle 50 may be located near and correspond to the air filter outlet according to an alternative embodiment. Further, although the baffle 50 is shown to be attached to the filter media 40, it is also anticipated that the baffle 50 may be attached to the housing 30 and still located in a local region around the inlet 32, according to another embodiment.

The baffle 50 may be made out of variety of materials, including but not limited to plastic and metal (e.g., stamped sheet metal).

According to one embodiment and as shown in FIGS. 3A-3B, the baffle 50 is a part of and integral with the circumferential outer surface 48 (e.g., the out wrap) of the filter media 40.

According to other embodiments as shown in FIGS. 8A-8D, the baffle 50 is an integral component with the end cap 42 (i.e., the baffle 50 and the end cap 42 are formed as a single component). Providing the baffle 50 and the end cap 42 as an integral component allows for easier keying alignment and assembly due to the baffle 50 that forms a rigid outer section.

According to other embodiments and as shown in FIGS. 4A-4C and 7A-7D, the baffle 50 is added onto the outer surface 48 of the filter media 40 as a separate or add-on component. Further, the baffle 50 may be a separate component from the end cap 42 and the filter element 26, instead being attachable to the end cap 42 and/or the filter element 26.

Figure 22B:
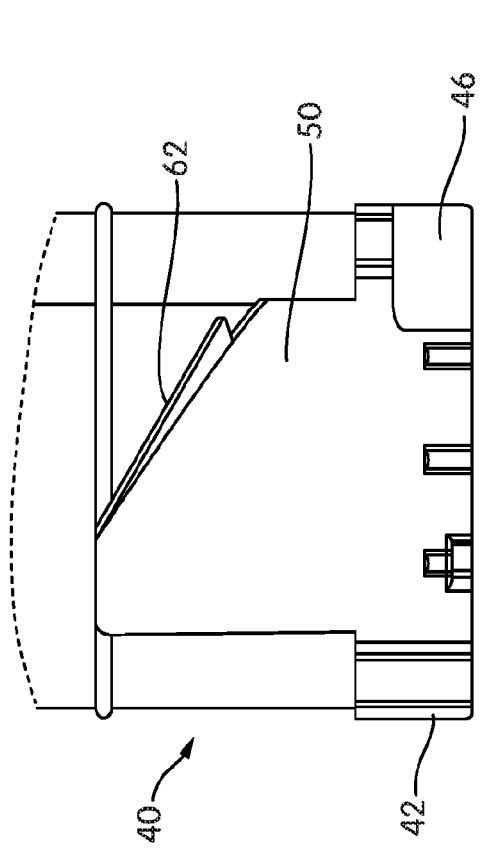
FIG. 22B is a partial side view of the filter element of FIG. 22A.
Figure 22C:
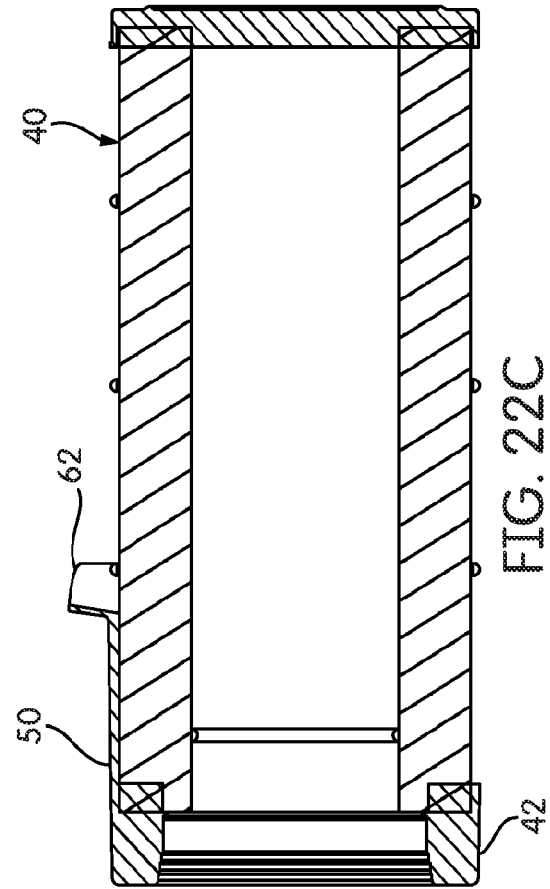
FIG. 22C is a cross-sectional view of the filter element of FIG. 22A.
Figure 22A:
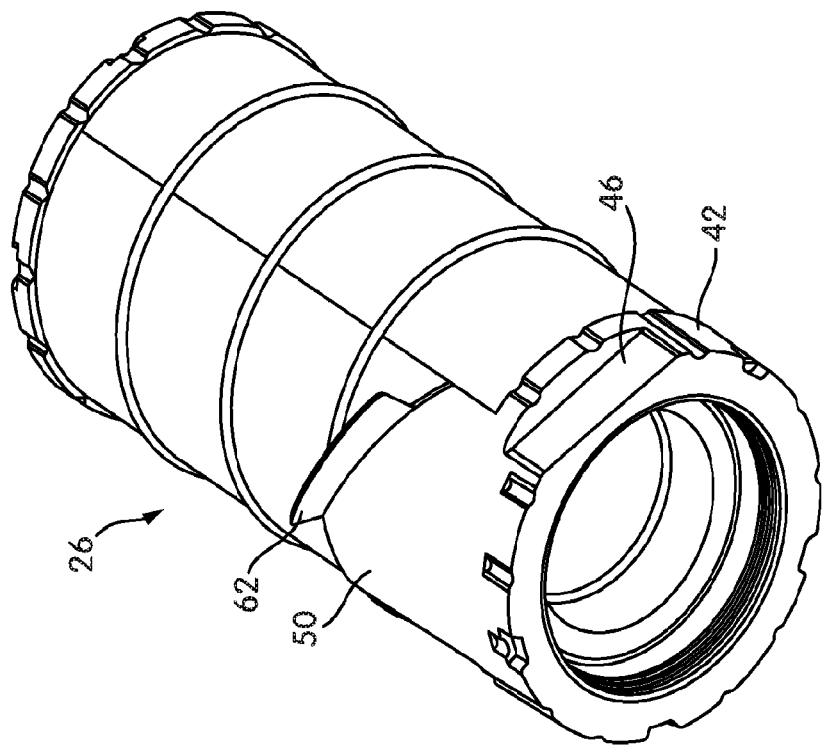
FIG. 22A is a perspective view of a filter element according to yet another embodiment.

According to another embodiment as shown in FIGS. 21A-21C and 22A-22C, the baffle 50 is an integral component with the end cap 42. Accordingly, the baffle 50 and the end cap 42 (which may include the keying feature 46) are formed (through, for example, pouring or molding) together at the same time. The baffle 50 and the end cap 42 are formed out of the same material, such as urethane or polyurethane, and are formed or potted at the same time together. The baffle 50 that is integral with the end cap 42 may optionally not include a vane (as shown in FIGS. 21A-21C) or may optionally include the integrated vane 62 (as described further herein and as shown in FIGS. 22A-22C). Accordingly, the end cap 42, the baffle 50, and the vane 62 may be made from the same material and formed or molded at the same time.

To reduce the size of the baffle 50, the baffle 50 may correspond to and may be approximately the shape and size of the inlet 32. The length of the baffle 50 may be adjusted to a variety of different lengths in order to specifically fine tune the system performance of the air filter 20 according to the desired application of the air filter 20.

As shown in FIGS. 4A-4C and according to an alternative embodiment, the baffle 50 may be a variety of different sizes to change or fine-tune the length and coverage of the baffle 50 according to the desired configuration or specific application. The baffle 50 may include one baffle with a specific size or multiple baffles to create the desired size, as described further herein. The various size baffles may include, but are not limited to, a small size baffle 51, a medium size baffle 52, and/or a large size baffle 53. However, it is anticipated that a variety of other baffle sizes may be provided. Accordingly, the baffle 50 is usable with any size housing 30, inlet 32, and filter media 40 and may cover all of the perimeter of the filter media 40 or only a small portion of the perimeter.

According to one embodiment, one of the baffle sections 54 (e.g., the small size baffle 51, the medium size baffle 52, or the large size baffle 53) may be attached to the filter element 26. The baffle with the desired baffle size may be initially inserted or attached to the filter element 26 or the existing baffle may be replaced by a baffle with the desired baffle size such that one baffle 50 is attached to the filter element 26. Accordingly, the various baffle sections 54 may be attachable along a section of the outer perimeter of the sidewall 39 of the filter media 40 as well as detachable from and reattachable to the sidewall 39. This process may be completed during manufacturing or post-manufacturing.

According to another embodiment, multiple baffle sections 54 may be placed next to each other or overlap each other along a portion or section of the outer perimeter of the filter media 40 to change the size of the baffle 50. The baffle sections 54 may be the same size baffle or may be different baffle sizes (such as the small size baffle 51, the medium size baffle 52, and/or the large size baffle 53). By adding or removing the various baffle sections 54, the coverage of the baffle 50 along the filter media 40 is changed.

According to one embodiment, baffle 50 may be an add-on element to allow the filter element 26 to be fine-tuned according to the user's preferences and/or to allow the baffle 50 to be attached to existing filters in standard filter manufacturing. Accordingly, various portions of the filer element 26 and/or the baffle 50 may include attachment mechanisms to help attach the baffle 50 to the filter media 40 and/or the end cap 42. The baffle 50 may be attached to the filter media 40 and/or the end cap 42 with a variety of different attachment mechanisms, including but not limited to, a snap-fit relationship, a press-fit relationship, adhesives, or a tongue and groove relationship. The end cap 42 may attach to or over the baffle 50 to secure the baffle 50 to the filter media 40.

As shown in FIGS. 4A and 4C, the baffle 50 includes openings to allow a portion of the end cap 42 to fit within, thus creating a mechanical lock between the baffle 50 and the end cap 42. For example, as the end cap 42 is being formed, the end cap material (e.g., urethane) may flow through the openings on the baffle 50 to create the mechanical lock.

Baffle Vane

According to another embodiment as shown in FIGS. 11A-12D, the baffle 50 includes an extension or vane 62 to further direct the air entering in through the inlet 32 of the housing 30. As shown in FIGS. 12A-12B, the baffle vane 62 extends substantially perpendicularly to the outer surface 48 of the filter media 40 and to a radial covering area 64 of the baffle 50. The radial covering area 64 is configured to extend alongside and cover a portion of the outer surface 48 of the filter media 40 and is positioned directly across from or proximate the inlet 32 of the housing 30 after installation. Accordingly, the baffle vane 62 extends along a portion of the outer perimeter of the filter media 40 next to the radial covering area 64. The vane 62 and the baffle 50 may be integral components as shown, for example, in FIGS. 22A-22C and formed together at the same time.

The vane 62 is positioned at the top of the baffle 50 such that the vane 62 and the connection of the baffle 50 to the end cap 42 are on opposite sides of the radial covering area 64. The height of the vane 62 (e.g., the distance that the vane 62 extends substantially perpendicularly from the radial covering area 64 of the baffle 50) is such that the vane 62 nears or abuts the inner surface of the sidewall 39 of the housing 30 when the filter media 40 (with the baffle 50) is positioned within the housing 30. One embodiment of an extension to a vane is shown in U.S. Pat. No. 8,828,114, the entire disclosure of which is incorporated by reference herein in its entirety.

Figure 11B:
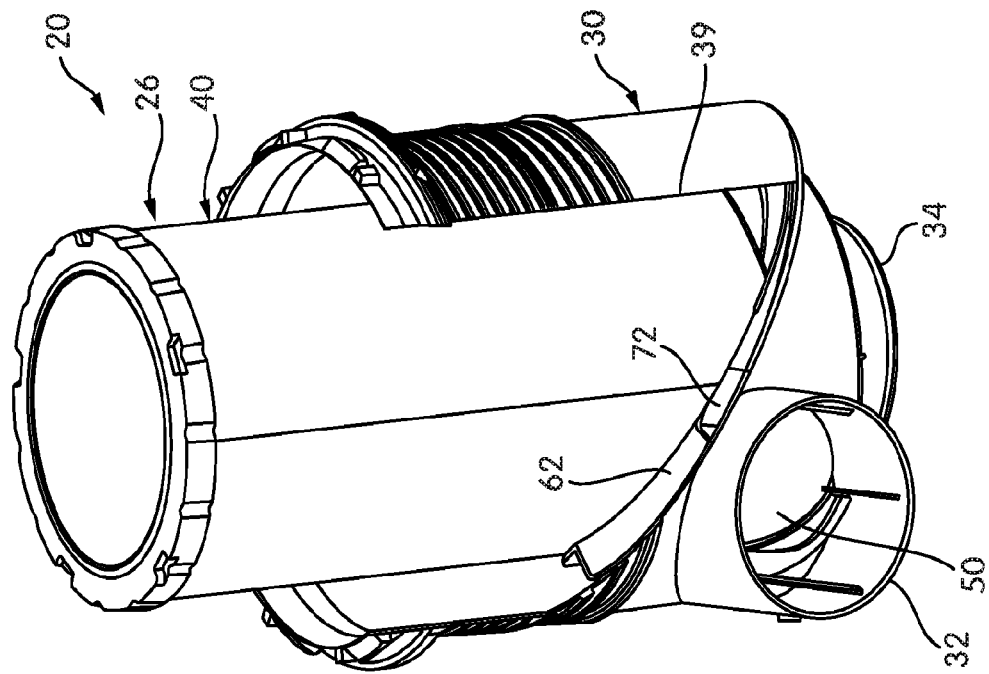
FIG. 11B is a perspective, cut-away view of the air filter of FIG. 11A.
Figure 11A:
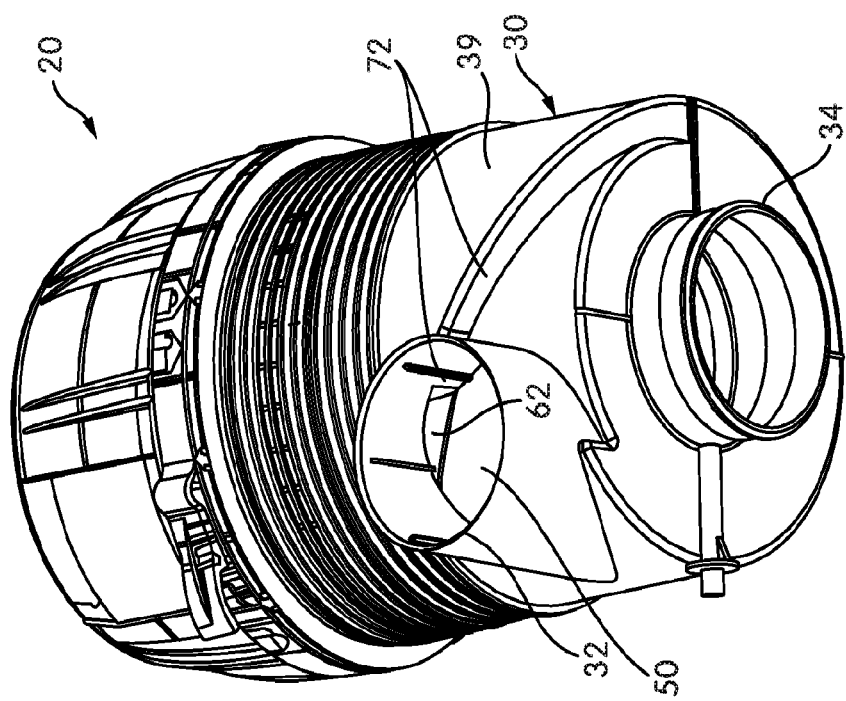
FIG. 11A is a perspective view of an air filter according to yet another embodiment.
Figure 12C:
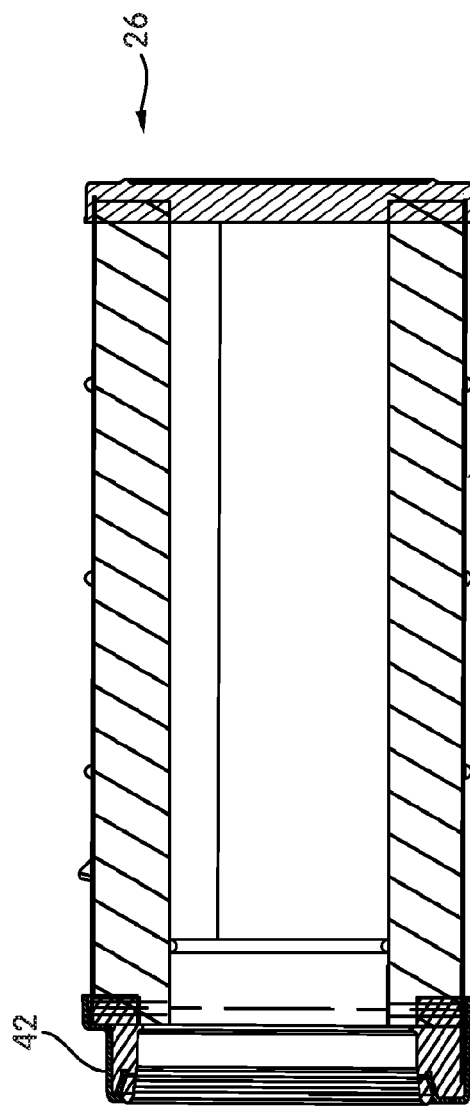
FIG. 12C is a cross-sectional view of the filter element of FIG. 12A.
Figure 12D:
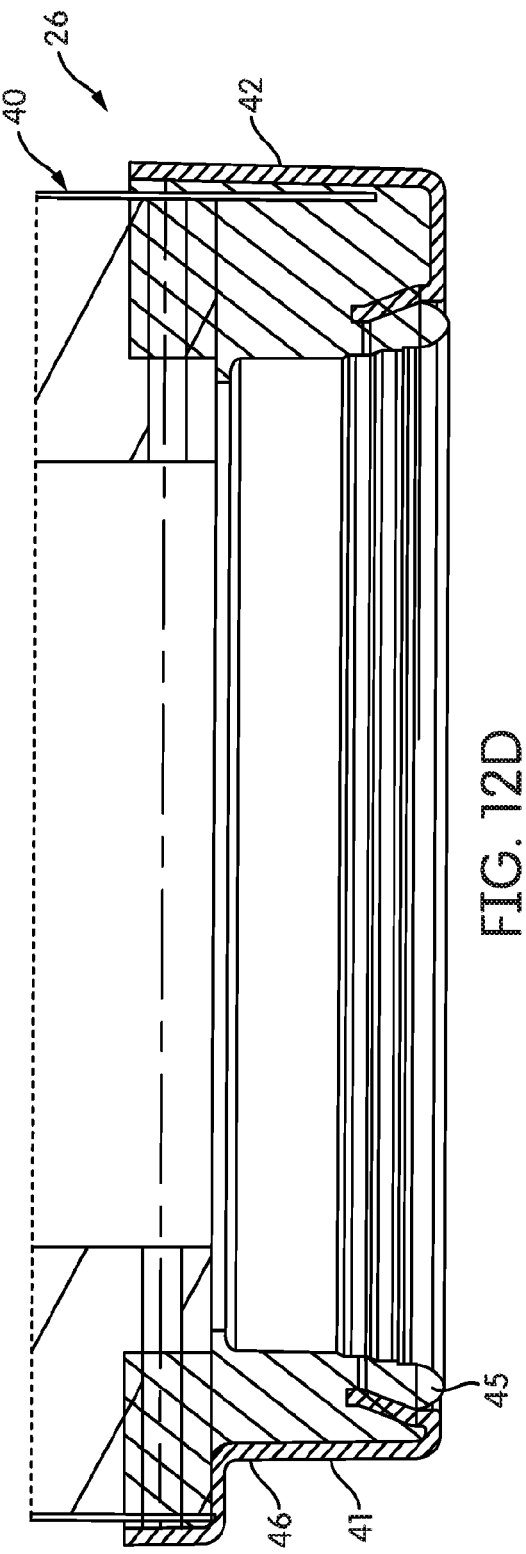
FIG. 12D is an enlarged, partial cross-sectional view of the filter element of FIG. 12A.

The housing 30 may also include a housing vane 72. As shown in FIG. 11A, the housing vane 72 extends into the housing 30 from the sidewall 39 of the housing 30 such that the housing vane 72 is substantially perpendicular to the sidewall 39 of the housing 30.

As shown in FIGS. 11A-11D, the vane 62 of the baffle 50 is positioned within the housing 30 such that the baffle vane 62 is a continuation or extension of the vane 72 of the housing 30. For example, the baffle vane 62 is in line with the end of the housing vane 72 and continues along the direction of extension of the housing vane 72. Accordingly, the vane 62 of the baffle 50 may increase the pre-cleaner separator length by further extending the effective length of the vane 72 along the length of the filter media 40, which further improves the pre-cleaner performance of the air filter 20.

Keying Features

Figure 5C:
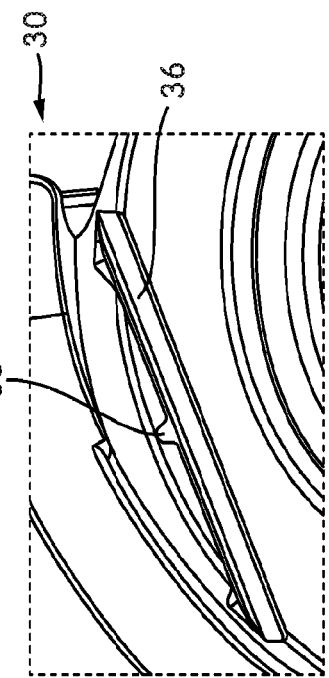
FIGS. 5B-5C are front-perspective and close-up perspective views of a housing that may be disposed in the air filter of FIG. 5A.

According to one embodiment and as shown in FIGS. 2, 3A-3B, and 5A-5C, since the baffle 50 may not encompass the perimeter of the filter media 40, the air filter 20 includes keying features 36 and 46 to properly align the baffle 50 and the inlet 32 of the housing 30 and thus provide optimal performance. For example, the keying features 36 and 46 allow the filter media 40 to fit only in a particular orientation and location within the housing 30. The keying features 36 and 46 are located on or towards an open end (e.g., the outlet 34, as shown in FIG. 5C) of the housing 30. More specifically, the housing 30 includes a housing keying feature 36 (as shown in FIG. 2) and the end cap 42 of the filter media 40 includes a media keying feature 46 (as shown in FIGS. 3A-3B). The media keying feature 46 and the corresponding housing keying feature 36 have complementary geometries such that the keying features 36 and 46 can engage with each other and fit together and maintain the relative positioning, alignment, and/or orientation of the housing 30 and the filter media 40. Accordingly, when the filter element 26 is correctly installed within the housing 30, the filter element 26 is fully engaged and interlocked with the housing 30.

The keying features 36 and 46 may possess a variety of different shapes and configurations, depending on the desired locking interaction between the keying feature 36 and 46. As shown in FIGS. 2, 3A-3B, and 5A-5C, the keying features 36 and 46 may include a ridge, a recessed region, or a flat surface along a portion of the perimeter of the housing 30 and the filter cap 42 such that a portion of the perimeters is flat and another portion is curved. The keying feature 36 is located on the inside perimeter of the housing 30 and the keying feature 46 is located on the outer perimeter of the end cap 42. Accordingly, when the end cap 42 is positioned within the housing 30, the flat portions of the keying features 36 and 46 (and the curved portions of the keying features 36 and 46) fit or interlock together to prevent relative movement or rotation between components, as shown in FIG. 5A.

Figure 5B:
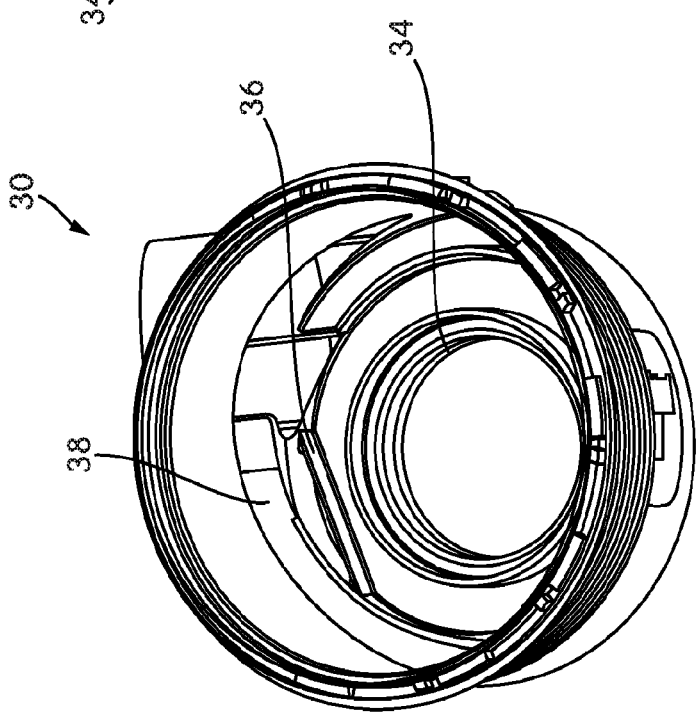

As shown in FIGS. 5B-5C and according to one embodiment, the housing keying feature 36 includes a protrusion 38, or other similar features, for additional support and for an additional keying feature. Accordingly, the filter media 40 may have complementary geometry to the keying feature 36 of the housing 30 to ensure that the correct filter is being used and/or to secure the filter media 40 to the housing 30. The protrusion 38 may be particularly beneficial when different sized baffles 50 may be used with the same size filter media 40 for fine-tuning. Additionally, the protrusion 38 may aid in the manufacturing of the filter housing 30. For example, the protrusion 38 may help the housing keying feature 36 eject from a mold. The protrusion 38 may be located in a variety of different locations within the housing 30, such as on either side of the wall of the housing keying feature 36.

As shown in FIGS. 3A-3B and 4B, the media keying feature 46 is located on the end cap 42. Alternatively or additionally, the media keying feature 46 may be located directly on the filter media 40.

Alternatively or additionally as shown in FIG. 4C, the baffle 50 includes a baffle keying feature 56. The baffle keying feature 56 may have complementary geometry to the keying features 36 and/or 46 to maintain relative orientations of each component. For example, the baffle keying feature 56 may interlock or align with the media keying feature 46 to ensure that the baffle 50 is properly oriented relative to, installed on, or attached to the filter media 40, regardless of the relative positioning of the housing 30. The baffle keying feature 56 of the baffle 50 may extend beyond a filtering portion of the filter media 40 and along the keying feature 46 of the filter media 40 to lock the relative positions of the baffle 50 and the filter media 40.

It is understood that the air filter 20 can include only two keying features 36, 46, and/or 56 or three of the keying features 36, 46, and 56 that are complementary to each other in order to ensure the correct configuration. Furthermore, it is understood that the housing 30, the filter media 40, and/or the baffle 50 may each have two keying features to that correspond separately to the respective keying features of the other two components within the air filter 20. For example, the filter media 40 may have two keying features 46 that correspond to either the housing keying feature 36 or the baffle keying feature 56 for proper alignment.

It is also understood that media keying feature 46 and the housing keying feature 36 can be used within an air filter 20, regardless as to whether the air filter 20 includes a baffle or what type of baffle is used. According to one embodiment as shown in FIGS. 16A-16C, the filter element 26 may include a full baffle ring 80 that extends around the entire circumference of the filter media 40 (e.g., the baffle ring 80 extends 360° around the filter media 40 in, for example, a full ring, and is attachable to the filter media 40). According to another embodiment as shown in FIGS. 17A-17C, the filter element 26 does not include any baffle (e.g., there is no baffle on the filter media 40). According to yet another embodiment as shown, for example, in FIGS. 15A-15D, the filter element 26 includes the baffle 50, as described further herein.

According to another embodiment as shown in FIG. 6, the inner diameter 43 of the end cap 42 is maximized and increased compared to previous air filters, which reduces the amount of material needed to make the air filter 20 and further improves the performance of the air filter 20. Increasing the diameter 43 of the end cap 42 increases the size (e.g., diameter) of the outlet 34 of the air filter 20 and thus further reduces the restriction across the air filter 20. According to yet another embodiment, the radius transition of the housing 30 may be increased from the flat end of the air filter 20 to the outlet 34 in order to help further reduce the restriction within the air filter 20.

According to one embodiment, the filter assembly 20 includes the filter housing 30 with the housing keying feature 36 that extends within an inner region of the filter housing 30. As described previously, the housing keying feature 36 is configured to engage with a complementary media keying feature 46. The filter assembly 20 also includes the filter media 40 that is configured to be received within the inner region of the housing 30.

The filter assembly 20 also includes the end cap 42 with a first end and a second end. The first end of the end cap 42 is positioned at and coupled to one end of the filter media 40 and has a first outer circumference. According to one embodiment as shown in FIGS. 18A-20C, the second end of the end cap 42 comprises a stepped-in or recessed ring 96.

Accordingly, the second end of the end cap 42 has a second outer circumference that is smaller than the first outer circumference of the end cap 42 such that the end cap 42 is stepped inward along the entire perimeter of the end cap 42 along the second end (relative to the first end). The second outer circumference of the end cap 42 is also smaller than the inner circumference of the housing 30 (measured in the region that includes the housing keying feature 36) such that the second outer circumference of the end cap 42 is stepped inboard of and fits inside of the housing keying feature 36 along the entire perimeter of the end cap 42. Accordingly, when the filter media 40 is installed within the housing 30, the second end of the end cap 42 bypasses and does not engage with the housing keying feature 36, and the end cap 42 does not need a feature (e.g., a keying feature) that is exactly complementary to the housing keying feature 36. According to one embodiment, the end cap 42 may rotate within and relative to the housing 30 when the filter media 40 and the end cap 42 are installed within the housing 30. The recessed ring 96 may be used with the baffle 50 (as shown in FIGS. 18A-18C), with no baffle (as shown in FIGS. 19A-19C), or with the full baffle ring 80 (as shown in FIGS. 20A-20C).

The filter assembly 26 may include a baffle (as described further herein) or may not include a baffle. According to particular embodiments as shown in FIGS. 16A-16C and 20A-20C, for example, the filter assembly 20 includes the full baffle ring 80 that extends around the entire circumference of the filter media 40 (e.g., the baffle ring 80 extends 360° around the filter media 40 in, for example, a full ring, and is attachable to the filter media 40). According to other embodiments as shown in FIGS. 17A-17C and 19A-19C, the filter assembly 20 does not include any baffle (e.g., there is no baffle on the filter media 40). According to yet another embodiment, the filter element 26 includes the baffle 50, which may be a partial baffle as shown in FIGS. 15A-15D and 18A-18C, as described further herein.

It is anticipated that the various components, configurations, and features of the different embodiments of the air filter 20 may be combined according to the desired use and configuration.

Experimental Data

Figure 14:
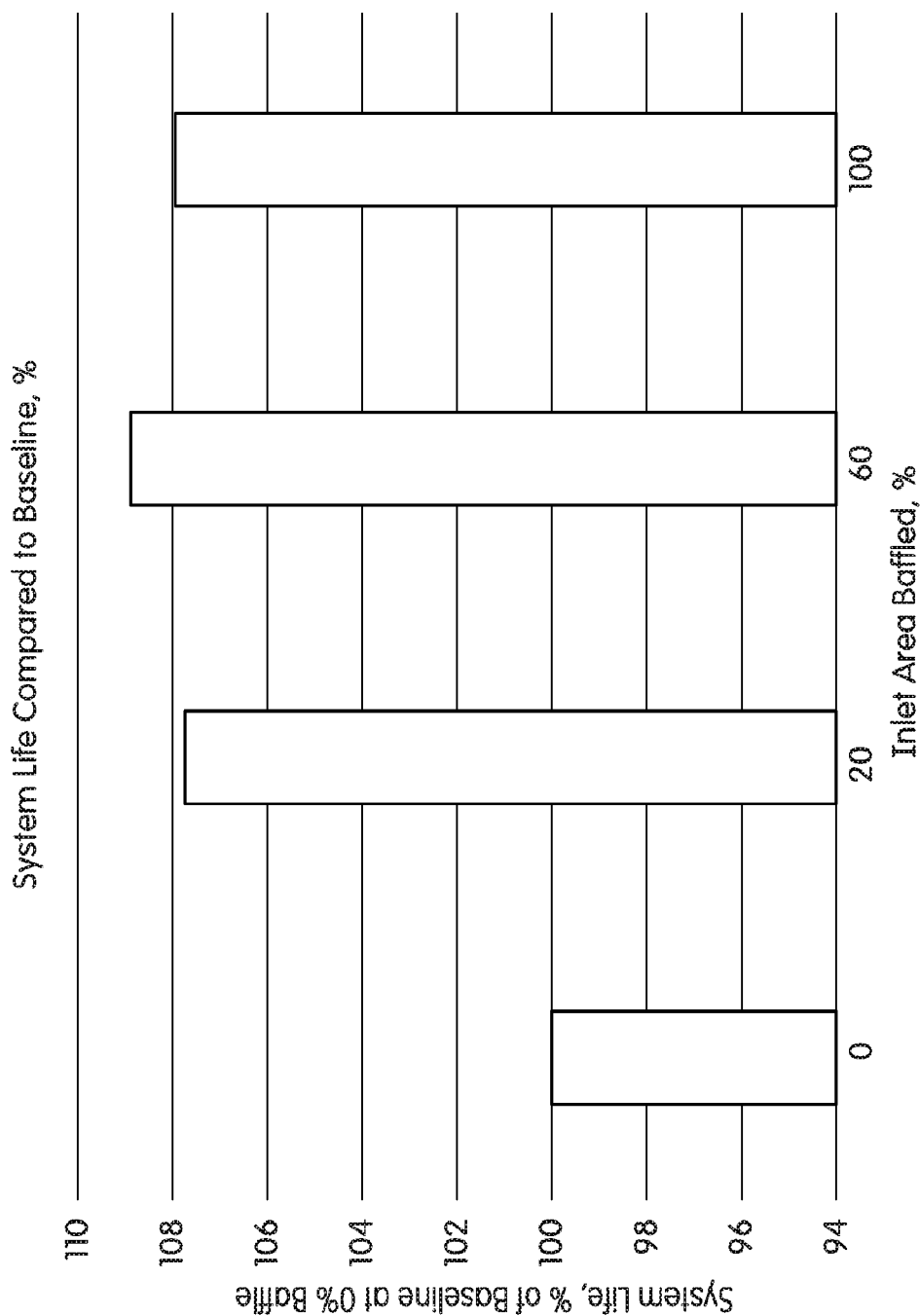
FIG. 14 is a graph showing experimental results of the system life as function of the percentage of the inlet covered by a baffle.

FIG. 14 is a graph providing experimental data and depicting the percentage of improvement of the system life of different air filters (compared to the baseline, when 0% of the inlet is covered by a baffle) as a function of the percentage that the inlet was covered by a baffle. The experiment was conducted at a single flow rate. The system life of each different percentages of the inlet covered was compared to the baseline system life (i.e., the system life with 0% of the inlet covered).

As shown, when 20% of the inlet is covered by the baffle, the system life of the filter is approximately 107.8%. When 60% of the inlet is covered by the baffle, the system life of the filter is approximately 108.9%. When 100% of the inlet is covered by the baffle, the system life of the filter is approximately 107.9%. These percentages of the system life are all system life percentages when compared to baseline testing (e.g., when 0% of the inlet is covered by a baffle).

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly, comprising:
 a filter housing including an inlet configured to accept a fluid for filtering; and
 a filter element positionable within the filter housing and comprising:
  a filter media configured to be secured within the housing, the filter media including a circumferential outer surface,
  an end cap positioned at and coupled to one end of the filter media,
  a media keying feature located on a circumferential outer surface of the end cap, and
  a baffle positioned relative the filter media at a position such that, when the filter element is correctly installed within the housing, the baffle is proximate the inlet of the housing such that incoming fluid enters through the inlet and then directly contacts the baffle, the baffle extending around only a portion of the circumferential outer surface of the filter media in a radial direction,
  the baffle comprising a baffle keying feature that has complementary geometry with and is configured to engage with the media keying feature to maintain relative orientations of the baffle and the filter media.

2. The filter assembly of claim 1, wherein the baffle is positioned proximate the end cap.

3. The filter assembly of claim 1, wherein the baffle includes at least two baffle sections configured to be attached along and detached from a section of an outer perimeter of the filter media.

4. The filter assembly of claim 1, further comprising a housing keying feature located on the housing, the media keying feature and the housing keying feature having complementary geometry and configured to engage with each other.

5. The filter assembly of claim 4, wherein the media keying feature is a flat portion of the circumferential outer surface of the end cap.

6. The filter assembly of claim 1, wherein the baffle includes a baffle vane that extends perpendicularly to a radial covering area of the baffle, and wherein the radial covering area covers the portion of the outer surface of the filter media.

7. The filter assembly of claim 6, wherein the housing includes a housing vane, and wherein the baffle vane is configured to align with the housing vane such that the baffle vane extends along the direction of extension of the housing vane.

8. The filter assembly of claim 1, wherein, when the filter element is correctly installed within the housing, the baffle is radially between the inlet and the filter media and in a line of flow of the incoming fluid such that the incoming fluid directly contacts the baffle and is directed into a pre-cleaning direction by the baffle before entering into the filter media.

* * * * *